United States Patent [19]

Horie

[11] Patent Number: 5,790,398
[45] Date of Patent: Aug. 4, 1998

[54] DATA TRANSMISSION CONTROL METHOD AND APPARATUS

[75] Inventor: Takeshi Horie, Kawasaki, Japan

[73] Assignee: Fujitsu Limited, Kawasaki, Japan

[21] Appl. No.: 801,183

[22] Filed: Feb. 18, 1997

Related U.S. Application Data

[63] Continuation of Ser. No. 377,176, Jan. 24, 1995, abandoned.

[30] Foreign Application Priority Data

Jan. 25, 1994  [JP]  Japan ................... 6-006159

[51] Int. Cl.$^6$ .................. G06F 15/163; G06F 1/12
[52] U.S. Cl. .............. 364/133; 395/553; 395/200.31; 395/200.78; 395/800.3
[58] Field of Search ................... 395/800, 650, 395/200.03, 200.19, 553, 800.3, 200.31, 200.32, 20.33, 200.78, 800.06, 800.05, 800.29, 852, 726, 287, 288, 289; 364/133

[56] References Cited

U.S. PATENT DOCUMENTS

| | | | |
|---|---|---|---|
| 4,612,541 | 9/1986 | Ohnishi | 340/825.05 |
| 4,843,543 | 6/1989 | Isobe | 364/200 |
| 4,935,863 | 6/1990 | Calvas et al. | 364/138 |
| 4,975,905 | 12/1990 | Mann et al. | 370/85.1 |
| 4,989,131 | 1/1991 | Stone | 364/200 |
| 5,040,175 | 8/1991 | Tuch et al. | 370/85.2 |
| 5,083,265 | 1/1992 | Valiant | 395/800 |
| 5,127,092 | 6/1992 | Gupta et al. | 395/375 |
| 5,157,692 | 10/1992 | Horie et al. | 375/38 |
| 5,278,975 | 1/1994 | Ishihata et al. | 395/550 |
| 5,285,448 | 2/1994 | Nakayama et al. | 370/85.15 |
| 5,339,439 | 8/1994 | Latimer et al. | 395/852 |
| 5,363,495 | 11/1994 | Fry et al. | 395/375 |
| 5,434,995 | 7/1995 | Oberlin et al. | 395/550 |
| 5,488,732 | 1/1996 | Matsumoto | 395/650 |
| 5,519,877 | 5/1996 | Yoneda et al. | 395/800 |
| 5,548,281 | 8/1996 | Funahashi et al. | 340/825.08 |
| 5,553,078 | 9/1996 | Horie | 370/94.3 |
| 5,579,527 | 11/1996 | Chin et al. | 395/800 |
| 5,581,705 | 12/1996 | Passint et al. | 395/200.13 |
| 5,581,778 | 12/1996 | Chin et al. | 395/800 |
| 5,598,555 | 1/1997 | Ito | 390/557 |
| 5,604,748 | 2/1997 | Date et al. | 370/449 |
| 5,613,136 | 3/1997 | Casavant et al. | 395/800 |
| 5,613,192 | 3/1997 | Ikami et al. | 455/4.2 |
| 5,630,157 | 5/1997 | Dwyer, III | 395/800.23 |
| 5,649,102 | 7/1997 | Yamauchi et al. | 345/200.43 |

*Primary Examiner*—Reba I. Elmore
*Assistant Examiner*—Robert J. Dolan
*Attorney, Agent, or Firm*—Staas & Halsey

[57] ABSTRACT

A transmission acknowledge flag is provided in a data transmission request command. When a send/receive control apparatus receives the data transmission command the transmission acknowledge flag, in an enable state a transmission counter is incremented. When the data transmission command is executed and data transmission is completed, the send/receive control apparatus causes the transmission counter to decrement. The send/receive control apparatus determines whether the data transmission has been completed based on the count value of the transmission counter.

24 Claims, 15 Drawing Sheets

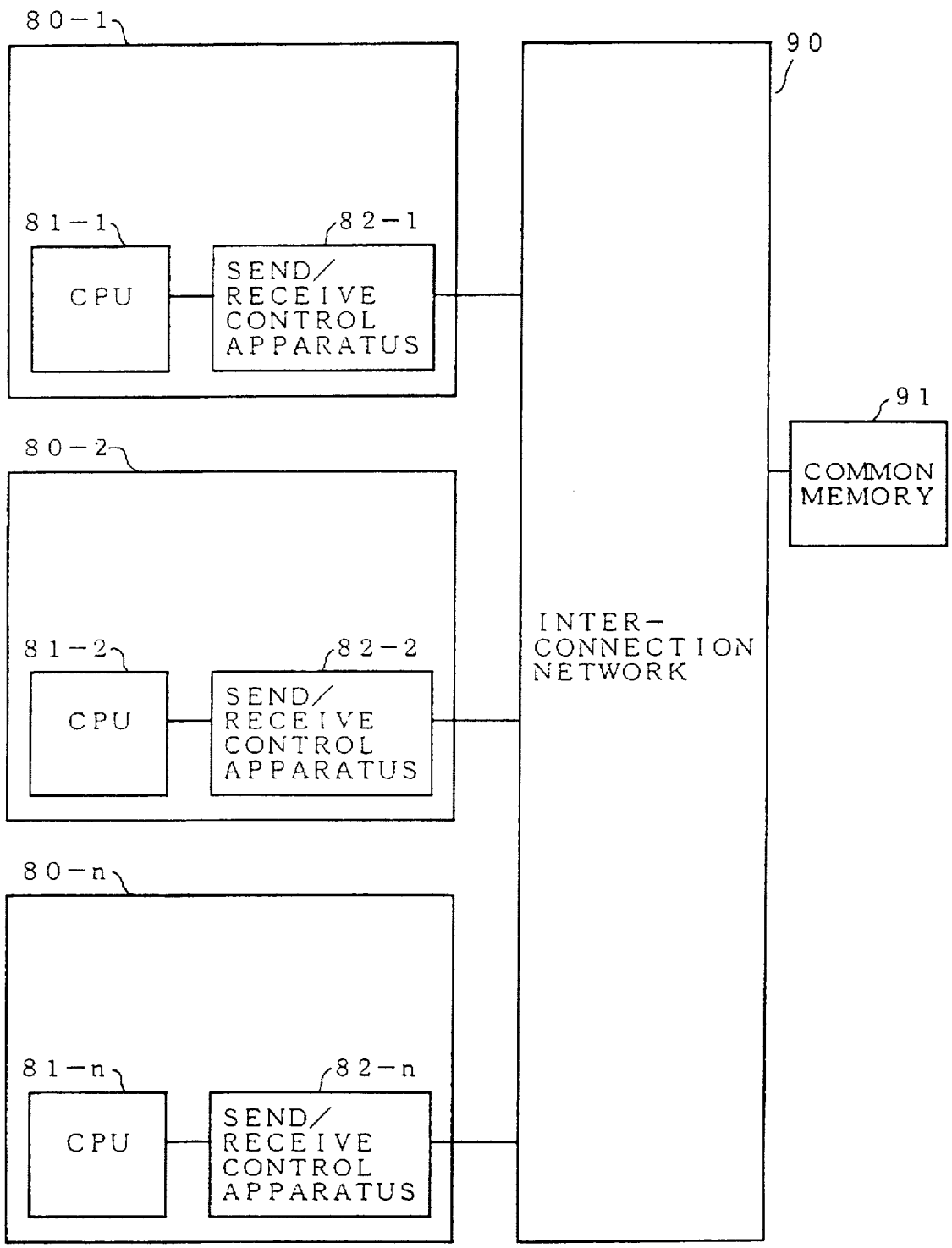
F I G. 15

1

DATA TRANSMISSION CONTROL METHOD AND APPARATUS

This application is a continuation of application Ser. No. 08/377,176, filed Jan. 24, 1995, now abandoned.

BACKGROUND OF THE INVENTION

1. Field of the Invention

The present invention relates to an inter-processor data transmission system for use with a parallel processing system having a plurality of processors connected through an interconnection network. In particular, the present invention relates to a system for acknowledging that data transmission has been completed among the processors or a system for acknowledging that data has been received by receiving processors.

2. Description of the Related Art

As a method for improving process speed of an information process apparatus, a parallel processing system has been developed. In the parallel processing system, a job is shared and processed in parallel by a plurality of processors. Thus, when one job is shared by n processors, the job can be ideally processed at speed n times higher than the conventional speed.

However, in the parallel processing system, since data is transmitted among the processors, the overhead thereof adversely affects the entire performance of the system. To reduce the overhead, a send/receive control apparatus that controls data transmission has been employed. In this configuration, when a processor sends data to other processors, a CPU of the processor requests the send/receive control apparatus to send the data. The send/receive control apparatus controls the data transmission. Thus, after a data transmission request command is issued, the CPU of the processor can execute another process.

In the parallel process employing a plurality of processors, each processor should execute a process in synchronization with processes of other processors. In other words, a data transmission process executed by a process may be halted until a predetermined condition is satisfied.

However, if such synchronization is not performed in the parallel processing system having the above-described send/receive control apparatus, the following problem will take place. For example, when a processor A sends data stored in a particular region to another processor B, if the processor A executes another process without acknowledging that the data has been sent, it may overwrite the data of the other process in the particular region before transmitting the data of the earlier process to the processor B. In this case, the processor B cannot receive the desired data.

Moreover, in the parallel processing system, barrier synchronization is frequently required. The barrier synchronization is a synchronizing system in which a processor can perform the next process only when all processors that operate in parallel achieve predetermined states. In the parallel process in which the processor A sends data to a plurality of processors B, C, and D and the entire system performs barrier synchronization, unless the processor A acknowledges that the data has been received by the processors B, C, and D, the processor A cannot execute the next process. Thus, to improve the process efficiency of the entire system, the processor A should acknowledge that the data has been received by the processors B, C, and D as soon as possible.

In the parallel processing system, each processor should occasionally acknowledge that data transmission has been completed among processors or that data has been received by receiving processors (as soon as possible).

The completion of data transmission or the data reception by the receiving processors is acknowledged in the following method. When a predetermined time period elapsed after a processor requested data transmission, it is assumed that the data transmission has been completed. Alternatively, when a predetermined time period elapsed, it is assumed that the receiving processors have received the data. However, in this method, when the predetermined time period is short, the synchronization will not be securely established. On the other hand, when the predetermined time period is unnecessarily long, the process efficiency of the system will be deteriorated.

As another method, when a processor requests the send/receive control apparatus to send a plurality of data, the processor successively sends data after acknowledging that data transmission of the previous request has been competed or replies have been received from the receiving processors. However, in this method, since the data transmission time inevitably becomes long, the effect of the send/receive control apparatus is deteriorated.

As described above, in the parallel processing system, when a processor requests the send/receive control apparatus to send data, in particular, when the processor issues a plurality of transmission requests to the send/receive control apparatus at the same time, it is necessary to effectively acknowledge that the data transmission has been completed or the data has been received by the receiving processors. However, so far, such an effective means has not been provided.

SUMMARY OF THE INVENTION

An object of the present invention is to effectively acknowledge that data transmission has been completed among processors in a parallel processing system and the data has been received by receiving processors so as to reduce data transmission time.

A first aspect of the present invention is a data transmission control method for use with a parallel processing system having a plurality of processors connected through an interconnection network, comprising following steps. A step of providing a transmission acknowledge region in a data transmission request command for requesting data transmission. A step of setting an enable state/disable state in the transmission acknowledge region. A step of incrementing the number of times of a first transmission request when a first data transmission request command with the enable state of the transmission acknowledge region is issued. A step of decrementing the number of times of the first transmission request when the first data transmission request command is executed and the data transmission according to the command is completed. And a step of determining whether or not the data transmission according to the first data transmission request command has been completed corresponding to the number of times of the first data transmission request.

A second aspect of the present invention is the data transmission control method according to the first aspect, further comprising following steps. A step of providing a transmission barrier region in the data transmission request command for requesting data transmission. A step of setting an enable state/disable state to the transmission barrier region. And a step of executing a second data transmission request command with the enable state of the transmission barrier region if it is determined that the data transmission according to a first data transmission request command has been completed corresponding to the number of times of the first transmission request, the second data transmission request command being issued after the first data transmission request command.

When the second data transmission request command with the enable state of the transmission barrier region is used, the second data transmission request command is executed after the data transmission according to the first data transmission request command is completed. Thus, the barrier synchronization can be established corresponding to the execution result of the second data transmission request command.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 15 is a block diagram showing an overall configuration of a parallel processing system applied for a shared memory configuration according to the present invention.

DESCRIPTION OF PREFERRED EMBODIMENTS

Figure 1:
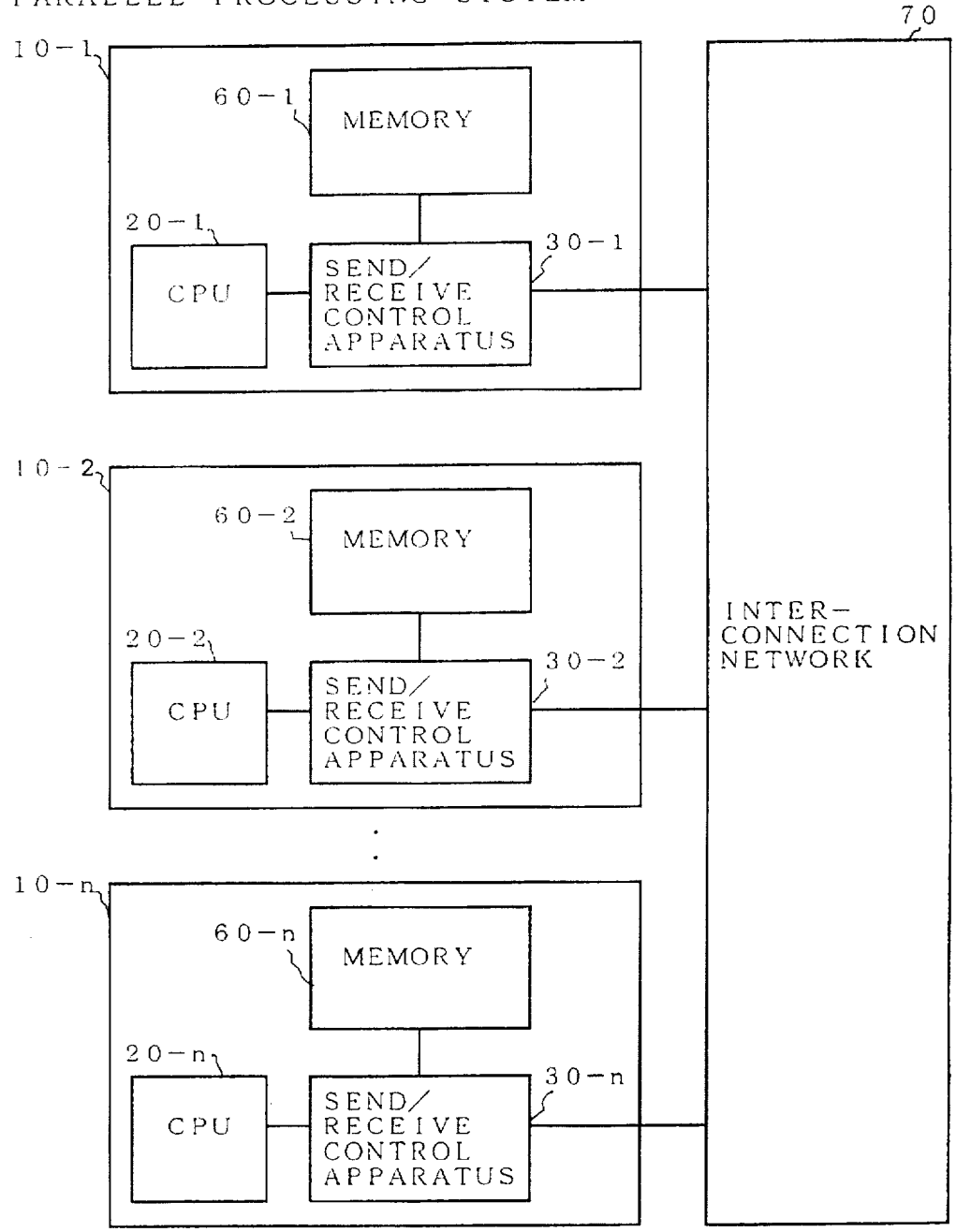
FIG. 1 is a block diagram showing an overall configuration of a parallel processing system according to the present invention.

FIG. 1 is a block diagram showing an overall configuration of a parallel processing system according to an embodiment of the present invention. Referring to FIG. 1, reference numeral 10-1 is a processor. The processor 10-1 comprises a CPU 20-1, a send/receive control apparatus 30-1, and a memory 60-1. Reference numerals 10-2, . . . , and 10-n are processors that have the same configuration as the processor 10-1. Thus, the processor 10-n comprises the CPU 20-n, the send/receive control apparatus 20-n, and the memory 60-n. Reference numeral 70 is a high speed interconnection network that connects the processors 10-1, 10-2, . . . , and 10-n.

In the above-described parallel processing system, the processors 10-1, 10-2, . . . , and 10-n process a job on distribution basis. The processors 10-1, 10-2, . . . , and 10-n send data to other processors through the interconnection network 70. For example, when the processor 10-1 sends data to the processor 10-2, the CPU 20-1 issues a data transmission request command that designates the ID of the receiving processor 10-2, source address, destination address, and so forth so as to request the send/receive control apparatus 30-1 to send the data. The send/receive control apparatus 30-1 sends the requested data to the processor 10-2 corresponding to the issued command. When the processor 10-2 receives the data, it sends a reply signal to the processor 10-1 when necessary.

Thus, the send/receive control apparatus 30 controls data transmission to other processors corresponding to a data transmission request issued from the processor 10-n. A processor can designate itself a data transmission destination corresponding to the data transmission request command. In the following description, the processor 10-n represents any processor of the processors 10-1, 10-2, . . . , and 10-n. This rule applies to the CPU 20-n, send/receive control apparatus 30-n, and the memory 60-n.

Figure 2:
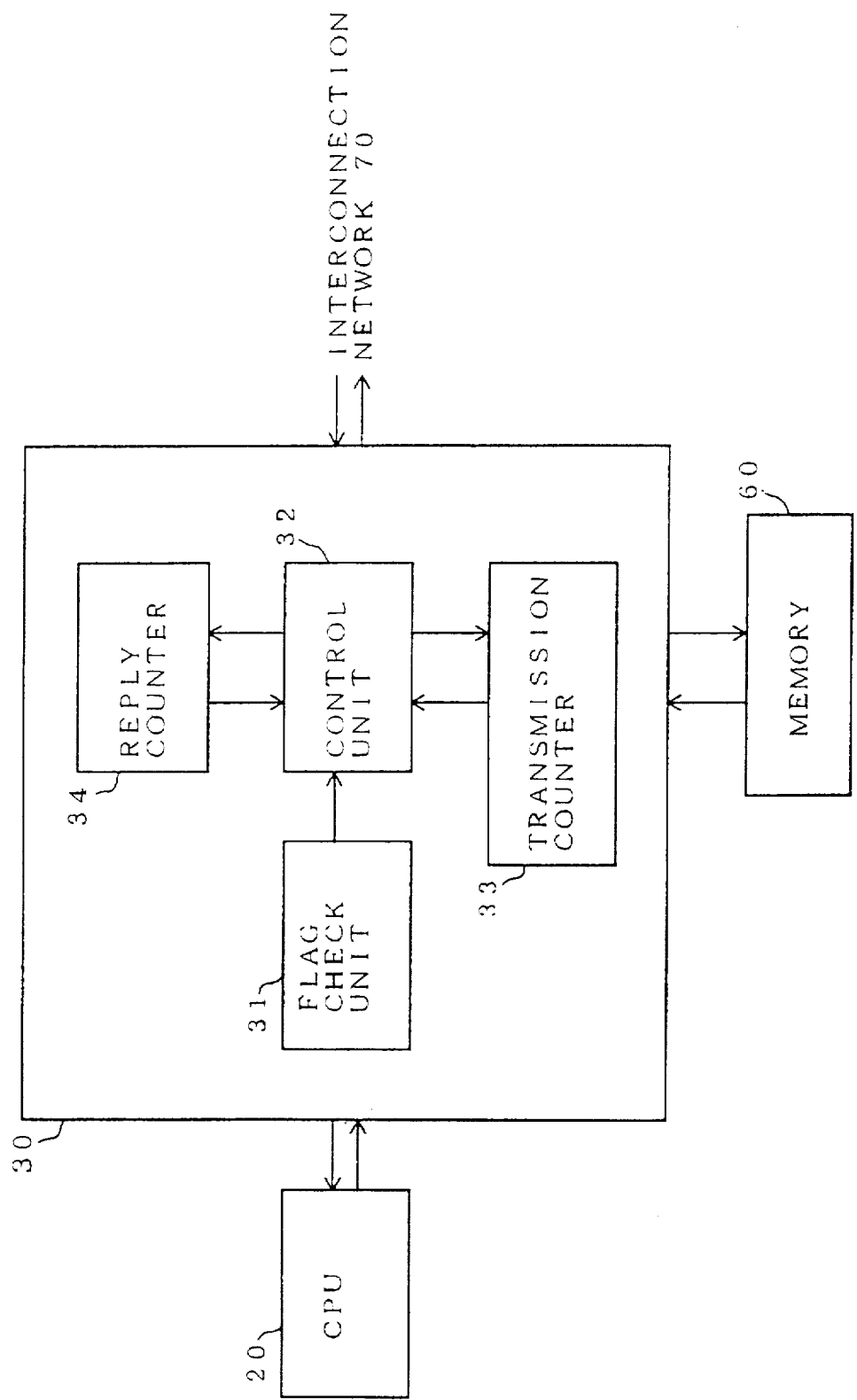
FIG. 2 is a functional block diagram showing a send/receive control apparatus.

FIG. 2 is a block diagram showing the configuration of the send/receive control apparatus 30. A flag check unit 31 detects and recognizes the state of each flag of the data transmission request command. A control unit 32 interprets various commands including the data transmission request command and controls memory access, data sending/receiving operation, a transmission counter 33, and a reply counter 34. The transmission counter 33 counts the number of times of data transmission requests under the control of the control unit 32 and sends the count value to the control unit 32. The reply counter 34 counts the number of times of data transmission requests that should be replied from the receiving side under the control of the control unit 32 and sends the count value to the control unit 32.

Figure 3A:
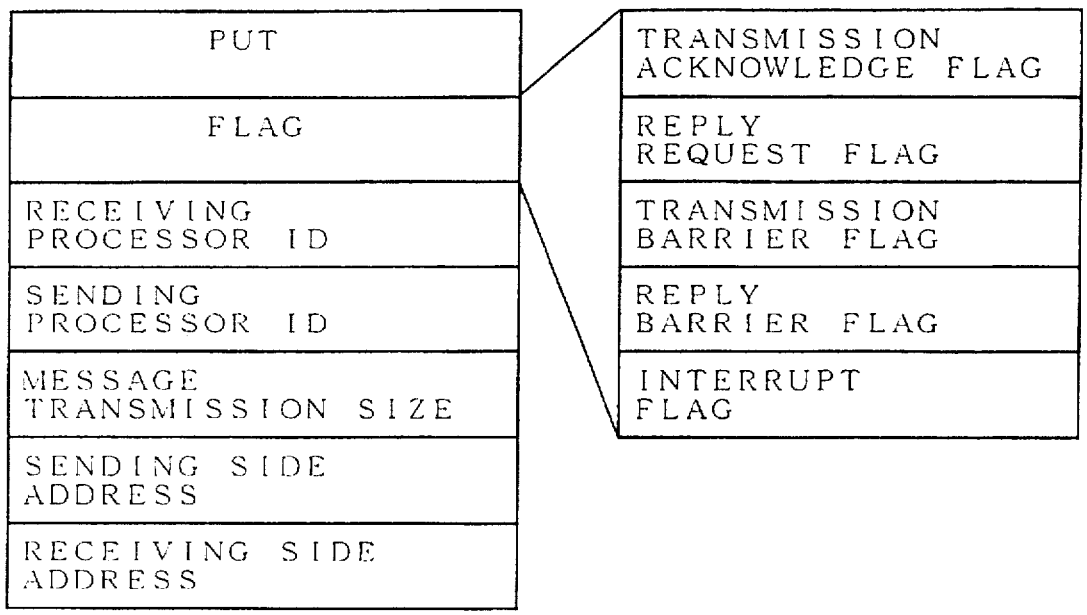
FIG. 3A is a schematic diagram showing data transmission request command for use with data transmission.
Figure 3B:
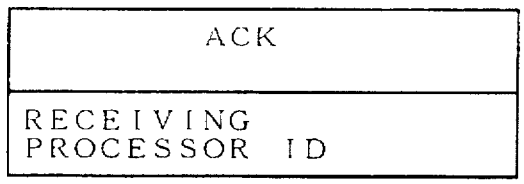
FIG. 3B is a schematic diagram showing a reply command for use with data transmission.
Figure 3C:
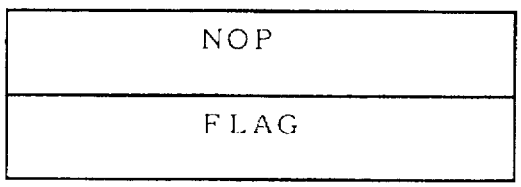
FIG. 3C is a schematic diagram showing an NOP command for use with data transmission.

FIGS. 3A, 3B, and 3C are schematic diagrams for explaining commands processed by the send/receive control apparatus 30. FIG. 3A is a schematic diagram showing a data transmission request command that comprises a command identifier PUT, flags, a receiving processor ID, a sending processor ID, a message transmission size, a sending side memory address (source address), and a receiving side memory address (destination address). The command identifier PUT represents the "data transmission request" command. The receiving processor ID represents the identifier of a receiving processor. The sending processor ID represents the identifier of a sending processor. The message transmission size represents the size of transmission data. The sending side memory address represents the address at which the transmission data is stored in the memory of the sending processor. The receiving side memory address represents the address at which the transmission data to be stored in the memory of the receiving processor.

The flags of the data transmission request command include a transmission acknowledge flag, a reply request flag, a transmission barrier flag, a reply barrier flag, and an interrupt flag. Next, the functions of these flags will be described.

The transmission acknowledge flag (transmission acknowledge region) represents whether or not the data transmission request command requires to an acknowledgement that data transmission has been completed. When the transmission acknowledge flag of the data transmission request command is in the enable state, it is necessary to acknowledge whether or not the data transmission performed by the command has been completed.

The reply request flag (reply request region) represents whether or not the data transmission request command requires to an acknowledgement that data has been received by a receiving processor. When the reply acknowledge flag of the data transmission request is in the enable state, it is necessary to acknowledge that data has been received by the receiving processor. This acknowledgement is performed by receiving a reply from the receiving processor.

The transmission barrier flag (transmission barrier region) represents whether or not the data transmission request command requires a barrier synchronization that is performed upon completion of the data transmission. When the data transmission request command with the enable state of the transmission barrier flag is issued, the data transmission according to the command is not executed until data transmission according to previously issued data transmission request commands is completed. (Here, "previously issued data transmission request commands" are commands which have been issued previous to the data transmission request command with the enable state of the transmission barrier flag is issued.) After the data transmission according to the previously issued data transmission request commands with the enable state of the transmission acknowledge flag has been performed, the data transmission according to the data transmission command with the enable state of the transmission barrier flag can be executed. Alternatively, after all the data transmission according to previously issued data transmission request commands regardless of a flag state has been completed the data transmission according to the data transmission request command with the enable state of the transmission barrier flag can be executed.

The reply barrier flag (reply barrier region) represents whether or not the data transmission request command requires a barrier synchronization that is performed when data has been received by a receiving processor. When the data transmission request command with the enable state of the reply barrier flag is issued, the data transmission according to the command is not performed until data transmitted according to previously issued data transmission request commands is received by receiving processors. (Here, "previously issued data transmission request commands" are commands which have been issued previous to the data transmission request command with the enable state of the reply barrier flag is issued.) The data transmission according to the data transmission request command with the enable state of the reply barrier flag can be executed after data transmitted according to previously issued data transmission request commands with the enable state of the reply request flag has been received by corresponding receiving processors. Alternatively, the data transmission according to the data transmission request command with the enable state of the reply barrier flag can be executed after acknowledging that all data according to previously issued data transmission request commands have been received by corresponding receiving processors regardless of the state of the flag. This acknowledgement is performed when replies are received from the receiving processors.

When the data transmission request command with the enable state of the interrupt flag (interrupt region) is executed, an interrupt to the CPU 20 takes place. There are a plurality of external interrupt factors. The interrupts correspond to those factors. When the data transmission request command is executed and the interrupt takes place, an interrupt request bit corresponding to the factor is set.

FIG. 3B is a schematic diagram showing a reply command. The reply command is composed of a command identifier ACK and a receiving processor ID. The command identifier ACK represents the "reply" command. The receiving processor ID is identifier of the processor that issues the data transmission request command. When the send/receive control apparatus 30 receives the data transmission request command with the enable state of the reply request flag and data corresponding to the command, the apparatus 30 sends a reply command to the processor that has issued the data transmission request command.

FIG. 3C is a schematic diagram showing an NOP command that is a pseudo data transmission request command. The NOP command is composed of a command identifier NOP and flags. The command identifier NOP represents "pseudo data transmission request". The flags of the NOP command are the same as those of the data transmission request command. The NOP command is used to execute processes for synchronizing with other processors and for generating an interrupt to the CPU 20.

Next, with reference to FIGS. 1 and 2, the operation of the parallel processing system, particularly the send/receive control apparatus 30, according to the embodiment of the present invention will be described.

First, the CPU 20 issues the data transmission request command so as to request the send/receive control apparatus 30 to transmit data. When the send/receive control apparatus 30 receives the command and acknowledges the "data transmission request" corresponding to the command identifier PUT, the flag check unit 31 determines the states of the flags of the data transmission request command. When the transmission acknowledge flag of the received data transmission request command is in the enable state, the control unit 32 causes the transmission counter 33 to increment. The control unit 32 reads data from the sending side address of the memory 60 assigned by the data transmission request command and sends the data to a receiving processor through the interconnection network 70. After the data transmission of the data transmission request command has been completed, the control unit 32 causes the transmission counter 33 to decrement.

Thus, after the initial value of the transmission counter 33 is set to "0" and then the transmission counter 33 is counted up corresponding to the data transmission request command, when the count value becomes "0", it is acknowledged that the data transmission has been completed.

When the reply request flag of the data transmission request command received by the send/receive control apparatus 30 is in the enable state, the control unit 32 causes the reply counter 34 to increment. The control unit 32 sends predetermined data to a receiving processor corresponding to the data transmission request command. When the receiving processor receives the command and data from the sending processor, the receiving processor returns the reply command to the sending processor (which has issued the data transmission request command). When the control unit 32 of the sending processor receives the reply command, it causes the reply counter 34 to decrement.

Thus, after the initial value of the reply counter 34 is set to 0 and then the reply counter 34 is counted up corresponding to the data transmission request command, when the count value becomes "0", it is acknowledged that the data has been received by the receiving processor.

When the transmission barrier flag of the data transmission request command received by the send/receive control apparatus 30 is in the enable state, the control unit 32 determines whether or not data transmission according to previously issued data transmission request commands with the enable state of the transmission acknowledge flag has been completed. After the data transmission according to the previously issued data transmission request commands is completed, the data transmission request command with the enable state of the transmission barrier flag is executed so as to send data.

When the transmission barrier flag of the data transmission request command is in the enable state and the destination of the data transmission is designated to a predetermined address of the memory 60 of the local processor (sending processor), the CPU 20 can acknowledge that the data transmission according to the previously issued data transmission request commands has been completed corresponding to the data at the address.

When the transmission barrier flag and the interrupt flag of the data transmission request command are set to the enable state, the CPU 20 can acknowledge that the data transmission according to the previously issued data transmission request commands has been completed corresponding to an interrupt.

When the reply barrier flag of the data transmission request command received by the send/receive control apparatus 30 is in the enable state, the control unit 32 determines whether or not the send/receive control apparatus 30 has received all replies from receiving processors for the data transmission according to the previously issued data transmission request commands with the enable state of the reply request flag. After acknowledging that the replies have been received, the control unit 32 executes the data transmission request command with the enable state of the reply barrier flag so as to send data.

Thus, as with the method using the transmission barrier flag, the CPU 20 can acknowledge that data has been received by receiving processors by using the reply barrier flag. It should be noted that an interrupt that informs the CPU 20 of the completion of the data transmission may be processed as a different external interrupt factor from an interrupt that acknowledges that data has been received by receiving processors.

Figure 4:
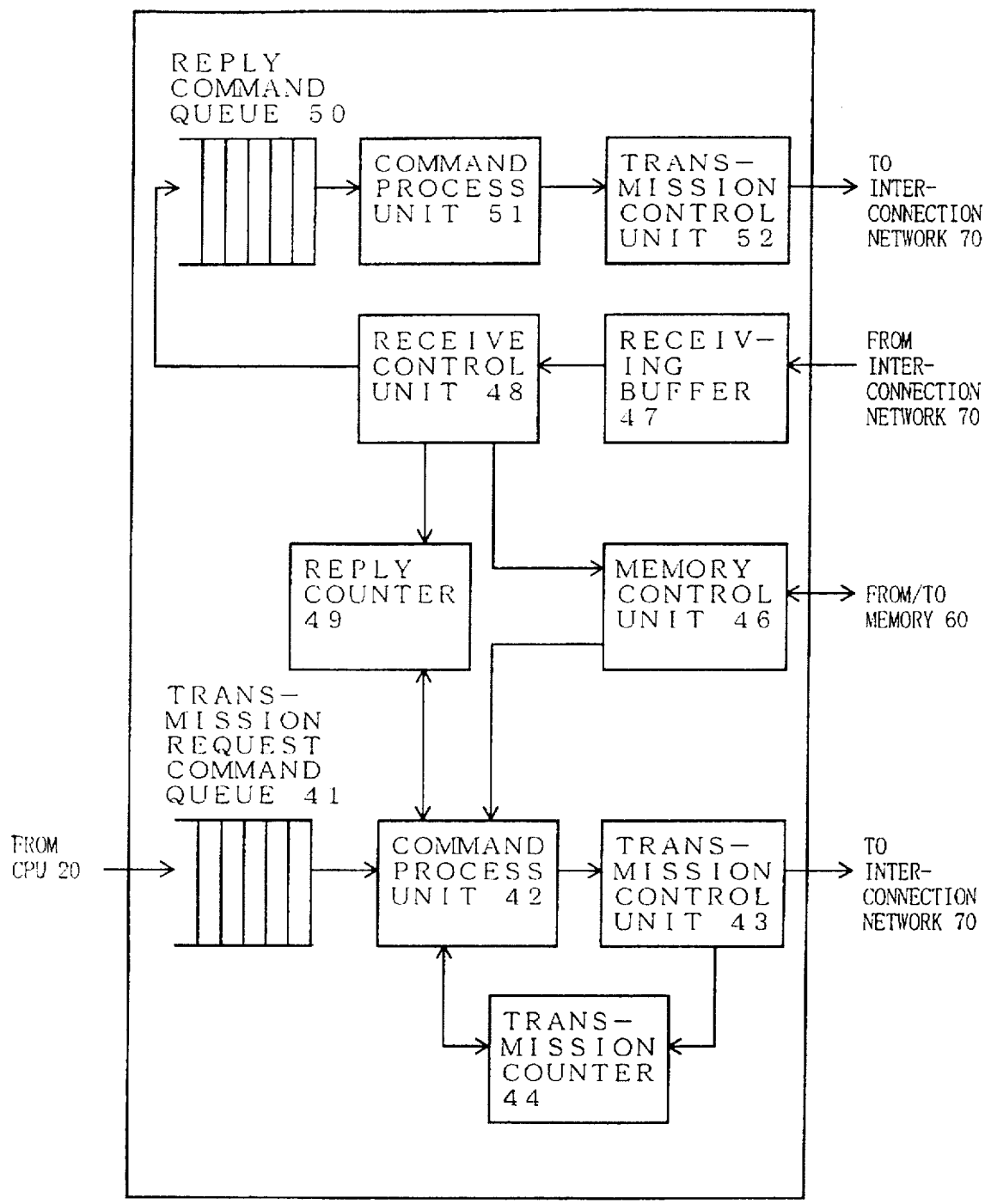
FIG. 4 is a block diagram showing the send/receive control apparatus.

FIG. 4 is a block diagram showing the send/receive control apparatus 30. A send/receive control apparatus 40 shown in FIG. 4 accords with the send/receive control apparatus 30 of the above-described embodiment.

A transmission request command queue 41 is a queue that stores the data transmission request command and the NOP command issued by the CPU 20 on FIFO basis. A command process unit 42 fetches the data transmission request command and the NOP command from the transmission request command queue 41, interprets the command, and processes it. The command process unit 42 determines the state of each flag of the data transmission request command and the NOP command. When the transmission acknowledge flag is in the enable state, the command process unit 42 causes a transmission counter 44 to increment. When the reply request flag is in the enable state, the command process unit 42 causes a reply counter 47 to increment. It should be noted that the command process unit 42 may cause the transmission counter 44 to increment regardless of the state of the flag corresponding to the reception of every data transmission request command.

When a receiving processor corresponding to the data transmission request command is a non-local processor, the transmission control unit 43 controls the transmission of data that is read from the memory 60 through a memory control unit 46 and that is sent to the receiving processor through the interconnection network 70 corresponding to a request from the command process unit 42. The transmission control unit 43 can send a singularity or a plurality of data. When the data transmission according to the data transmission request command with the enable state of the transmission acknowledge flag has been completed, the transmission control unit 43 causes the transmission counter 44 to decrement. In the configuration that the command process unit 42 causes the transmission counter 44 to increment regardless of the flag state corresponding to every data transmission request command, the transmission control unit 43 causes the transmission counter 44 to decrement whenever the data transmission request command is executed regardless of the flag state. The transmission counter 44 is a count means for counting the number of times of the data transmission requests. The count value represents the number of data transmission request commands that are currently being executed (namely, the number of data transmission request commands that have been fetched by the command process unit 42 and that have not been executed).

The memory control unit 46 controls data read operation and data write operation for the memory 60. A receiving buffer 47 temporarily stores a message (including a command and data) received from another processor through the interconnection network 70. A receive control unit 48 interprets a received message and determines the flag state of the received command. When the receive control unit 48 receives the data transmission request command with the enable state of the reply request flag, it generates the reply command to be sent to the sending processor of the data transmission request command and enqueues the reply command to a reply command queue 50. When the receive control unit 48 receives the reply command, it causes a reply counter 49 to decrement. The receive control unit 48 writes data received from another processor to the memory 60 through the memory control unit 46 corresponding to the data transmission request command. The reply counter 49 is a count means that counts the number of times of the reply request. The count value represents the number of data transmission request commands with the enable state of the reply request flag that have been fetched by the command process unit 42 and sent to the receiving processor and that a reply from the receiving processor has not been received.

A reply command queue 50 is a queue that stores the reply request command on the FIFO basis. A command process unit 51 fetches the reply command from the reply command queue 50, interprets the command, and activates a transmission control unit 52. The transmission control unit 52 sends a reply message (including the reply command) to the sending processor through the interconnection network 70.

The states of the transmission counter 44 and the reply counter 49 are always sent to the command process unit 42 with signals that represent whether or not the count values are "0". Alternatively, the count values of the counters 44 and 49 may be sent to the command process unit 42 at predetermined intervals. As a further alternative method, the count values of the counters 44 and 49 may be polled at predetermined intervals by the command process unit 42.

When the command process unit 42 fetches the data transmission request command with the enable state of the transmission barrier flag, it determines whether or not to execute the command corresponding to the state of the transmission counter 44. When the count value of the transmission counter 44 is "0", the command process unit 42 assumes that data transmission according to the previously issued transmission request commands with the enable state of the transmission acknowledge flag has been completed and executes the data transmission request command with the enable state of the transmission barrier flag. On the other hand, when the count value of the transmission counter 44 is not "0", the command process unit 42 does not execute the data transmission request command with the enable state of the transmission barrier flag.

When the command process unit 42 fetches a data transmission request command with the enable state of the reply barrier flag, it determines whether or not to execute the command corresponding to the count value of the reply counter 49. When the count value of the reply counter 49 is "0", the command process unit 42 assumes that data of previously issued data transmission request commands with the enable state of the reply request flag has been received by receiving processors and executes the data transmission request command with the enable state of the reply barrier flag. On the other hand, when the count value of the reply counter 49 is not "0", the command process unit 42 does not execute the data transmission request command with the enable state of the reply barrier flag.

When the command process unit 42 executes the data transmission request command with the enable state of the interrupt flag, it generates an interrupt to the CPU 20.

It should be noted that the command process units 42 and 51 can be commonly configured. In addition, the transmission control units 43 and 52 can be commonly configured.

Figure 5:
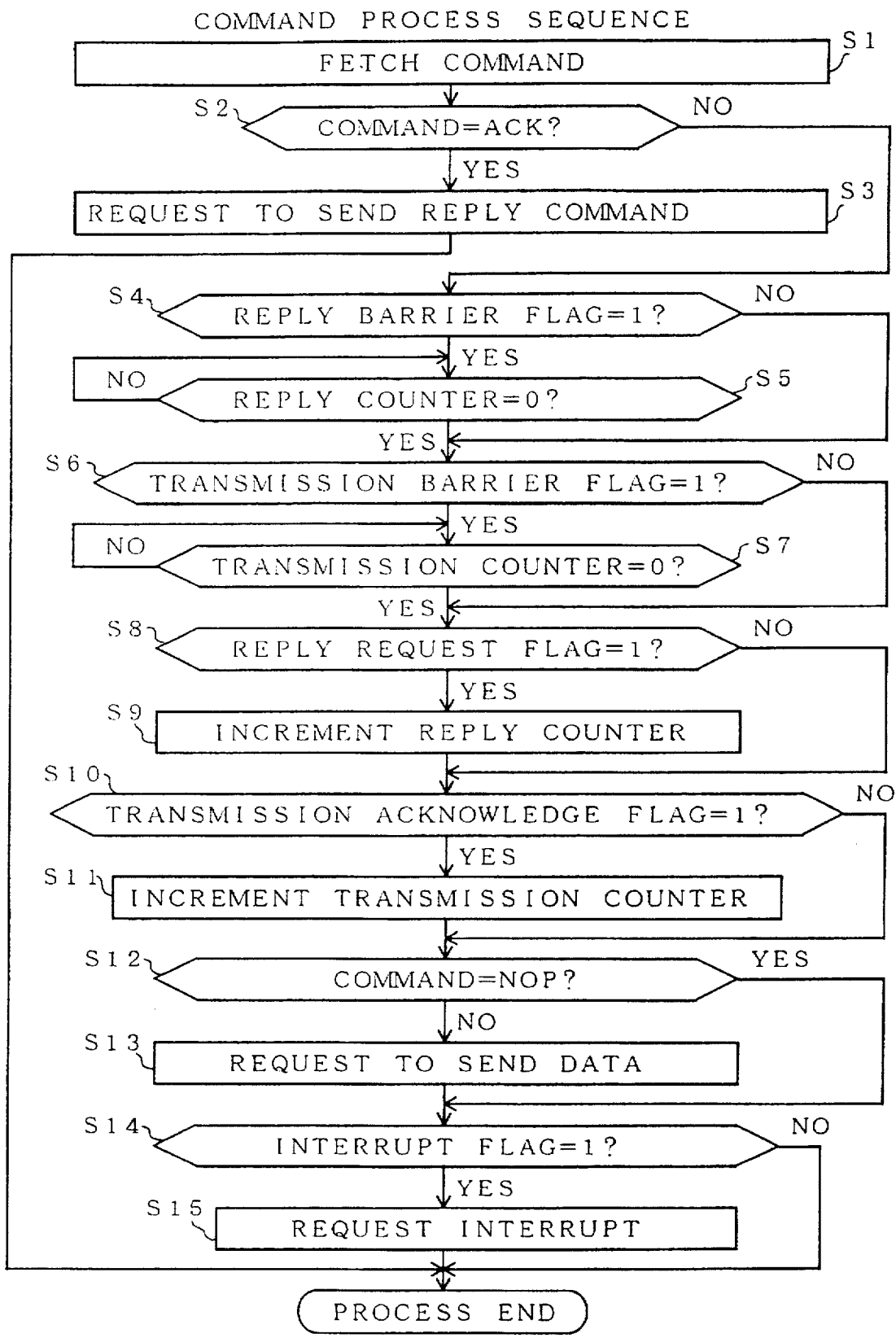
FIG. 5 is a flow chart showing a command process sequence.

FIG. 5 is a flow chart showing a command process sequence executed by the command process units 42 and 51 of the send/receive control apparatus 40.

At step S1, a command is fetched from the transmission request command queue 41 or the reply command queue 50. At step S2, it is determined whether or not the fetched command is the reply command corresponding to the command identifier thereof. When the fetched command is the reply command (namely, the command identifier is ACK), the flow advances to step S3. At step S3, the transmission control unit 52 is requested to send the reply command. Thus, the process is completed.

When the command fetched at step S1 is not the reply command (namely, the fetched command is the data transmission request command or the NOP command), the flow advances to step S4. At step S4, it is determined whether or not the reply barrier flag is "1". In the following description, when each flag is "1", it represents the enable state; when each flag is "0", it represents the disable state. When the reply barrier flag is "0", the flow advances to step S6. When the reply barrier flag is "1", the flow advances to step S5. At step S5, it is determined whether or not the count value of the reply counter 49 is "0". When the count value is not "0", the flow does not advance to the next step until the count value becomes "0". When the count value is "0", the flow advances to step S6.

At step S6, it is determined whether or not the transmission barrier flag is "1". When the transmission barrier flag is "0", the flow advances to step S8. When the transmission barrier flag is "1", the flow advances to step S7. At step S7, it is determined whether or not the counter value of the transmission counter 44 is "0". When the counter value is not "0", the flow does not advance to the next step until the counter value becomes "0". When the counter value is "1", the flow advances to step S8.

At step S8, it is determined whether or not the reply request flag is "1". When the reply request flag is "0", the flow skips step S9 and advances to step S10. When the reply request flag is "1", the flow advances to step S9. At step S9, the reply counter 49 is incremented. The flow advances to step S10.

At step S10, it is determined whether or not the transmission acknowledge flag is "1". When the transmission acknowledge flag is "0", the flow skips step S11 and advances to step S12. When the transmission acknowledge flag is "1", the flow advances to step S11. At step S11, the transmission counter 44 is incremented. The flow advances to step S12.

At step S12, it is determined whether or not the command fetched at step S1 is the NOP command. When the fetched command is the NOP command, the flow skips step S13 and advances to step S14. When the fetched command is not the NOP command, the command fetched at step S1 is the data transmission request command. The flow advances to step S13. At step S13, the transmission control unit 43 is requested to send data.

At step S14, it is determined whether or not the interrupt flag is "1". When the interrupt flag is "0", the process is completed. When the interrupt flag is "1", the flow advances to step S15. At step S15, an interrupt to the CPU 20 is generated. The process is completed.

As shown in the flow chart, the data transmission request command with the reply barrier flag="1" is executed when the count value of the reply counter 49 is "0". In other words, after the data transmission request command with the reply barrier flag="1" is executed, the count value of the reply counter 49 is "0". Likewise, after the data transmission request command with the transmission barrier flag="1" is executed, the count value of the transmission counter 44 is "0". In the initial state at which the system is started up, the count values of the transmission counter 44 and the reply counter 49 are "0".

Figure 6:
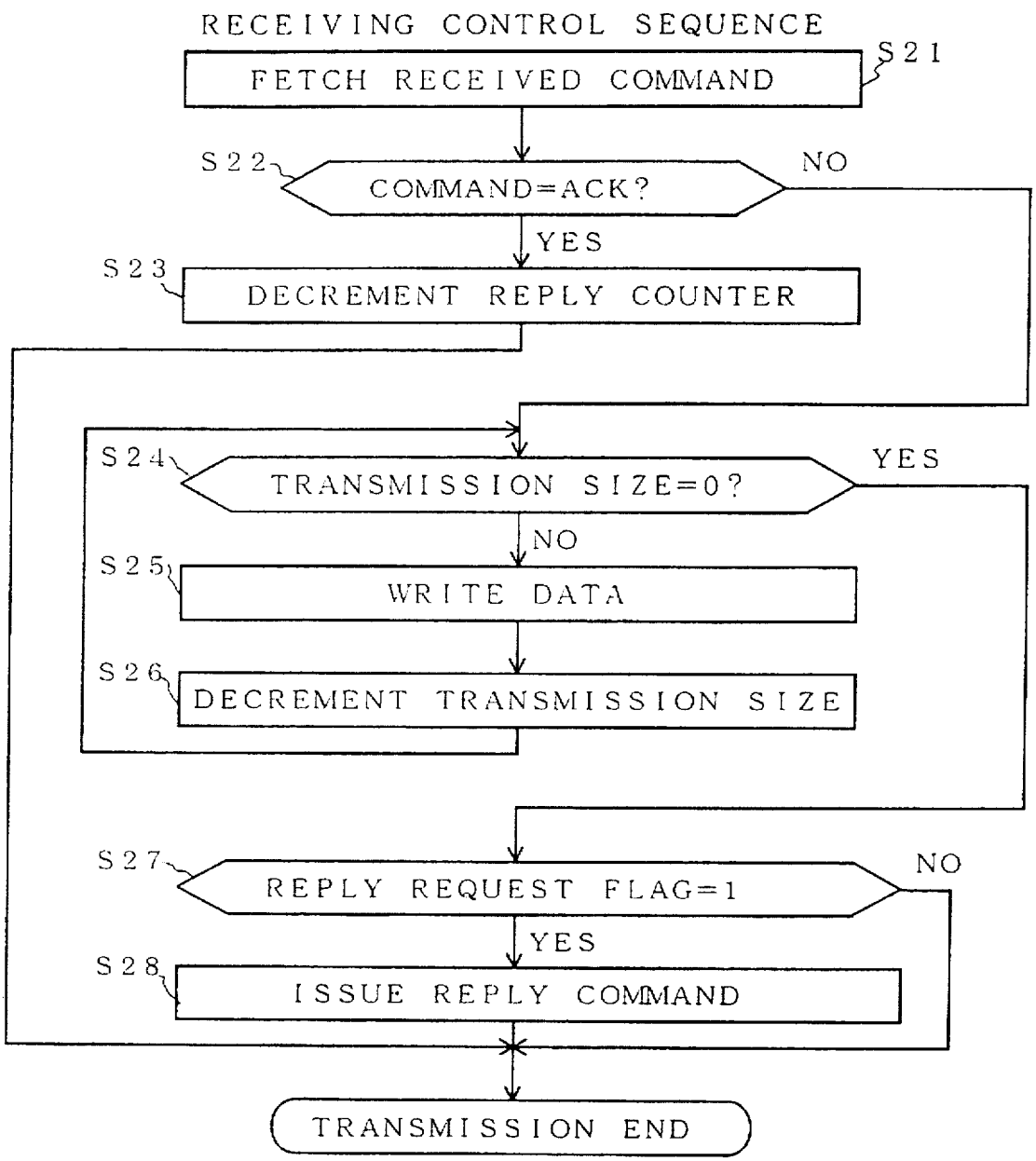
FIG. 6 is a flow chart showing a receiving control sequence.

FIG. 6 is a flow chart showing a process sequence executed by the receive control unit 48 of the send/receive control apparatus 40.

At step S21, a received command (received message) is fetched from the receiving buffer 47. At step S22, it is determined whether or not the fetched command is the reply command (ACK) corresponding to the command identifier thereof. When the fetched command is the reply command, the flow advances to step S23. At step S23, the reply counter 49 is decremented and the process is completed.

At step S21, when the fetched command is not the reply command (namely, the fetched command is the data transmission request command), the flow advances to step S24. At step S24, it is determined whether or not the message transmission size is "0". When the message transmission size is not "0", the flow repeats steps S24 to S26 until the message transmission size becomes "0". When the message transmission size is "0", the flow advances to step S27.

At step S25, transmitted data (received data) is written to a receiving side address of the memory 60 corresponding to the data transmission request command under the control of the memory control unit 46. At step S26, the message transmission size is decreased corresponding to the data amount written at step S25.

When the transmitted data has been written to the memory 60, the flow advances to step S27. At step S27, it is determined whether or not the reply request flag of the data transmission request command fetched at step S21 is "1". When the reply request flag is "0", the process is completed. When the reply request flag is "1", it is determined that the sending processor that has issued the data transmission request command requires a reply. The flow advances to step S28. At step S28, the reply command is issued and enqueued to the reply command queue 50. The receiving processor ID of the reply command is the processor that has issued the data transmission request command.

At steps S21 to S28, the reply counter 49 is decremented; the transmitted data is written to the memory; and the replay command is sent back.

Figure 7:
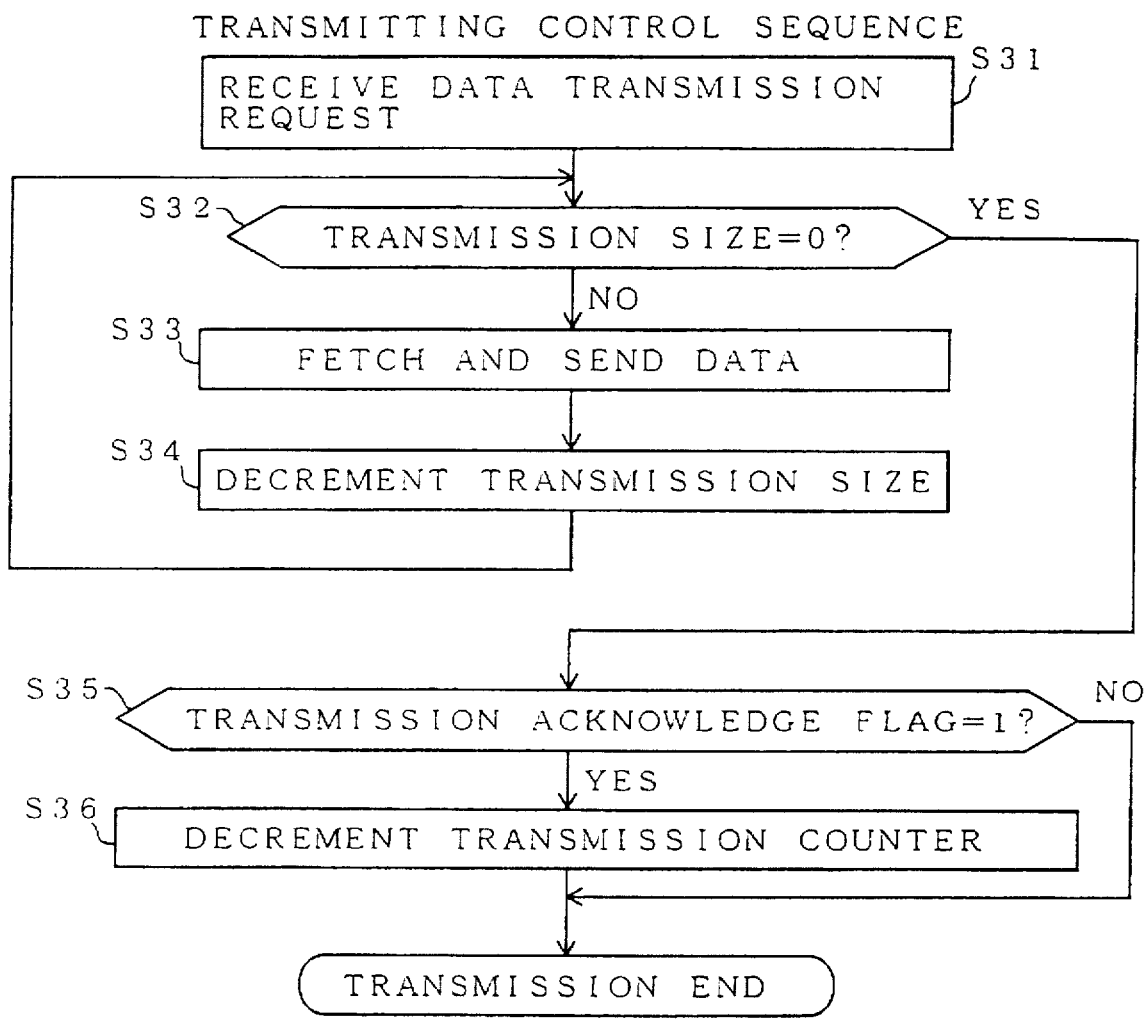
FIG. 7 is a flow chart showing a transmitting control sequence.

FIG. 7 is a flow chart showing a process sequence executed by the transmission control unit 43 or 52 of the send/receive control apparatus 40. The following process is activated by the data transmission request issued by the command process unit 42 at step S13 of FIG. 5.

At step S31, data transmission request issued from the command process unit 42 is received. As with the process shown in FIG. 5, the received command is the data transmission request command or the NOP command. At step S32, it is determined whether or not the message transmission size is "0". When the message transmission size is not "0", the flow repeats steps S32 to S34 until the message transmission size becomes "0". When the message transmission size is "0", the flow advances to step S35. When the received command is the NOP command, since the message transmission size has not been designated, the flow immediately advances to step S35.

At step S33, data to be transmitted is read from the sending side address of the memory 60 corresponding to the data transmission request command under the control of the memory control unit 46 and sent to a receiving processor through the interconnection network 70. When the receiving processor ID is designated to the local processor, the data is written to the region designated as the receiving side address of the memory 60 of the local processor. At step S34, the message transmission size is decreased corresponding to the data amount read at step S33.

By repeating steps S32 to S34, the message transmission size becomes 0. At these steps, the message transmission size is obtained from the data transmission request command. The size is stored in a register or the like. The stored value is decremented. Thus, the message transmission size stored in the data transmission request command is not 0, but the size of the message actually sent.

After the data transmission is completed, the flow advances to step S35. At step S35, it is determined whether or not the transmission acknowledge flag of the command fetched at step S31 is "1". When the transmission acknowledge flag is "0", the process is completed. When the transmission acknowledge flag is "1", the flow advances to step S36. At step S36, the transmission counter 44 is decremented and the process is completed.

At steps S31 to S36, data is sent and the transmission counter 44 is decremented.

Next, with reference to a flow chart of FIG. 8, a method for causing the CPU 20 to acknowledge a completion of data transmission to other processors will be described. In this case, it is assumed that the processor 10-1 sends data to processors A, B, and C and that the CPU 20-1 of the processor 10-1 acknowledges that the data transmission to these processors A, B, and C has been completed. In this case, it is also assumed that the processors A, B, and C are processors included in the processors 10-2, . . . , and 10-n. The count value of the transmission counter 44 is initialized to "0".

At step S41, a synchronous data region F in the memory 60-1 is initialized. In other words, "0" is written to the synchronous data region F pre-assigned to the memory 60-1. At least one bit is assigned to the synchronous data region F.

At steps S42 to S44, the CPU 20-1 successively issues the data transmission request commands to which respectively indicate the processors A, B, and C as receiving processors and requests the send/receive control apparatus 30-1 (send/receive control apparatus 40) to send data. In this case, each of the transmission acknowledge flag of the three data transmission request commands is "1".

At step S45, the CPU 20-1 issues the data transmission request command which indicates the local processor as a receiving processor. In the data transmission request command, the transmission barrier flag is "1"; the sending side address is a predetermined region in which "1" is stored; and the receiving side address is the synchronous data region F.

When the three data transmission request commands issued at steps S42 to S44 are executed, the transmission counter 44 is incremented at step S11 of FIG. 5. Thus, the count value of the transmission counter 44 becomes "3". Thereafter, in the transmitting control sequence shown in FIG. 7, data is sent to the processors A, B, and C. The flow advances to step S36. At step S36, every time the data transmission caused by the three data transmission request commands is completed, the transmission counter 44 is decremented. When all the data transmission according to the three data transmission request commands has been completed, the count value of the transmission counter 44 returns to "0".

When the data transmission request command issued at step S45 is executed, the flow advances to the sequence of FIG. 5. At step S7, the count value of the transmission counter 44 is determined. When the count value is not "0", it is determined that data transmission according to the three data transmission request commands has not been completed. The flow does not advance to the next step until the count value becomes "0". When the count value of the transmission counter 44 is "0", the data transmission according to the data transmission request command issued at step S45 is performed. In other words, "1" is written to the synchronous data region F of the memory 60-1.

Returning to FIG. 8, the flow advances to step S46. At step S46, the CPU 20-1 determines the value of the synchronous data region F. When the value of the synchronous data region F is "0", the flow repeats step S46. When the value of the synchronous data region F is "1", it is determined that the data transmission according to the three data transmission request commands issued at steps S42 to S44 has been completed.

In such a manner, the CPU 20-1 can determine that the data transmission according to the three data transmission request commands has been completed by searching the synchronous data region F of the memory of the local processor. In other words, the barrier synchronization that is performed upon completion of the data transmission according to the three data transmission request commands can be established.

Figure 9:
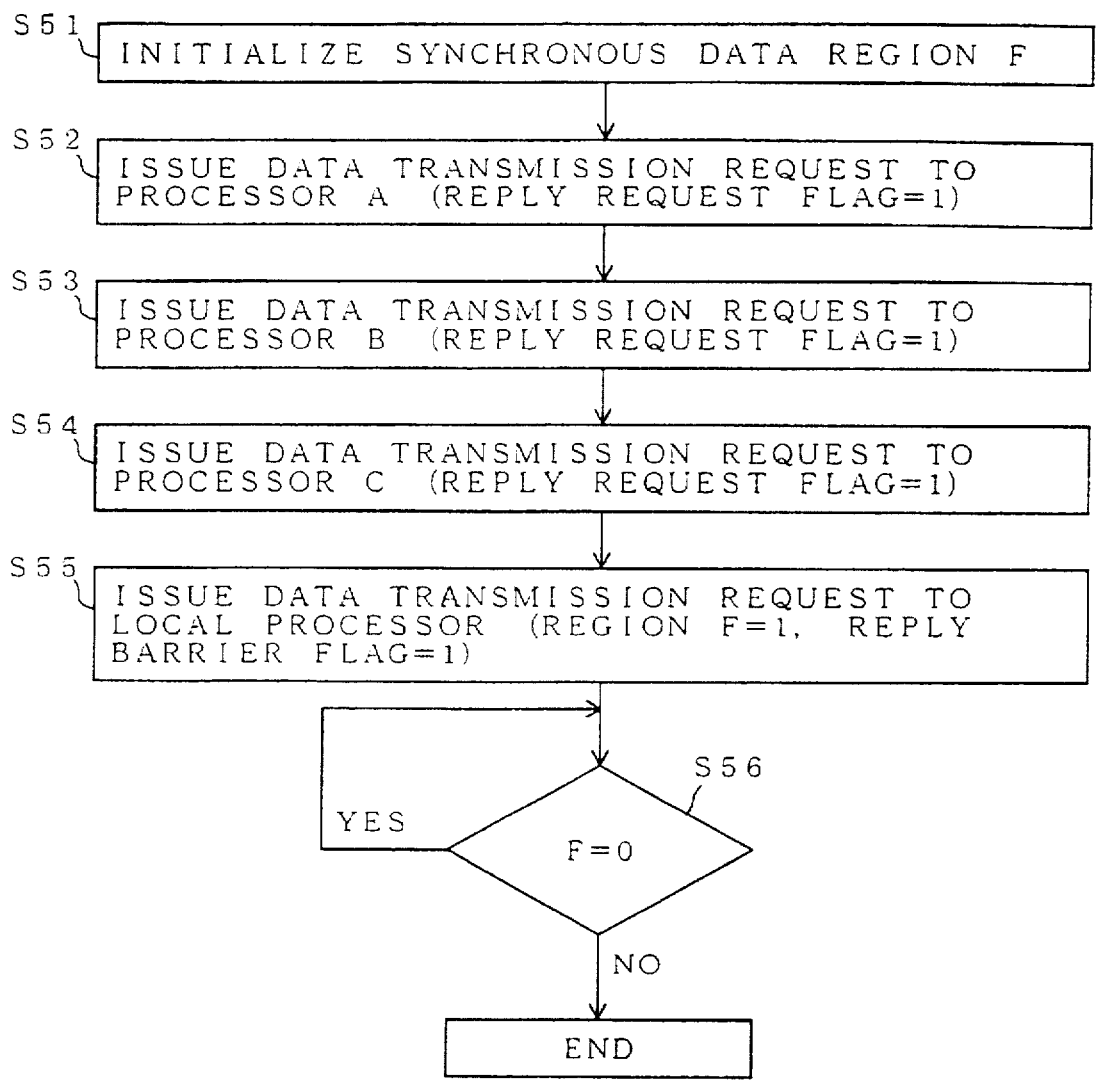
FIG. 9 is a first flow chart showing a process for acknowledging that data has been received by a receiving processor.

Next, with reference to a flow chart of FIG. 9, a method for causing the CPU 20 to acknowledge that data has been received by receiving processors will be described. In this case, it is assumed that a processor 10-1 sends data to processors A, B, and C and that a CPU 20-1 of the processor 10-1 acknowledges that data has been received by the processors A, B, and C. In addition, it is assumed that the count value of a reply counter 49 has been initialized to "0".

Figure 8:
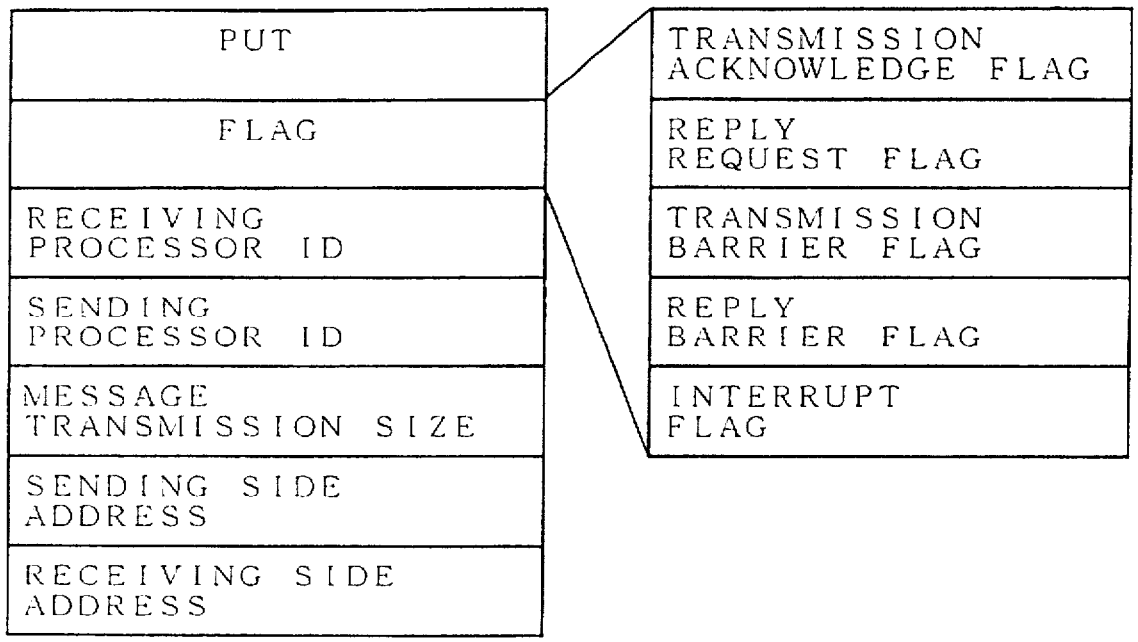
FIG. 8 is a first flow chart showing a process for acknowledging that data transmission has been completed.
Figure 8:
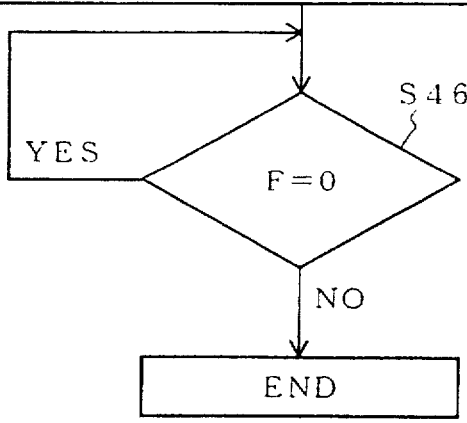

Steps S51 to S56 shown in FIG. 49 are basically the same as steps S41 to S46 shown in FIG. 8. However, the reply request flag of each of the data transmission request commands issued at step S52 to S54 is "1". The reply barrier flag of the data transmission request command issued at step S55 is "1".

When the three data transmission request commands issued at steps S52 to S54 are executed, the flow advances to the sequence of FIG. 5. At step S9, the reply counter 49 is incremented. Thereafter, in the transmitting control sequence shown in FIG. 7, data is sent to processors A, B, and C. When the data has been received by the processors A, B, and C, each of the processors A, B and C returns the reply command to the processor 10-1 (steps S27 and S28).

When the processor 10-1 receives the reply commands from the processors A, B, and C, the flow advances to the sequence of FIG. 6. At steps S22 and S23, the reply counter 49 is decremented. When the data transmitted according to the three data transmission request commands is received by the processors A, B, and C, and the processor 10-1 receives the three reply commands, the count value of the reply counter 49 returns to "0".

When the data transmission request command issued at step S55 is executed, the flow advances to the sequence of FIG. 5. At step S5, the count value of the reply counter 49 is determined. When the count value is not "0", it is determined that the data according to the three data transmission request commands has not been received by the processors A, B, and C. The flow does not advance to the next step until the count value becomes "0". When the count value of the reply counter 49 is "0", the data transmission of the data transmission request command issued at step S55 is performed. In other words, "1"is written to the synchronous data region F of the memory 60-1.

Returning to FIG. 9, the flow advances to step S56. At step S56, the CPU 20-1 determines the value of the synchronous data region F. When the value of the synchronous data region F is "0", the flow repeats step S56. When the value of the synchronous data region F is "1", it is determined that the transmission data according to the three data transmission request commands issued at steps S52 to S54 has been received by the processors A, B, and C.

In such a manner, the CPU 20-1 can acknowledge that the data according to the three data transmission request commands has been received by the receiving processors by searching the synchronous data region F of the memory of the local processor. In other words, the barrier synchronization that is performed when the data according to the three data transmission request commands has been received by the processors A, B, and C can be established.

Next, with reference to a flow chart of FIG. 10, a method for causing a CPU 20 to acknowledge that data transmission to another processor has been completed corresponding to an interrupt will be described. In this case, it is assumed that a processor 10-1 sends data to processors A, B, and C and that a CPU 20-1 of the processor 10-1 acknowledges that the data transmission to the processors A, B, and C has been completed.

At steps S61 to S63, the same data transmission request commands as those at steps S42 to S44 are issued. In other words, three data transmission request commands with the transmission acknowledge flag="1"are issued for the processors A, B, and C as receiving processors. The flow advances to step S64. At step S64, the CPU 20-1 issues the NOP command. The NOP command causes the transmission barrier flag and the interrupt flag to be set to "1".

After the data transmission request commands for the processors A, B, and C are issued, the NOP command with the transmission barrier flag="1"is issued. In this case, after the data transmission according to the three data transmission request commands has been completed, the NOP command is executed. When the NOP command is processed corresponding to the sequence shown in FIG. 5, at step S14, it is determined that the interrupt flag is "1". The flow advances to step S15. At step S15, an interrupt to the CPU 20-1 is generated.

Thus, the CPU 20-1 can acknowledge that the data transmission to the processors A, B, and C has been completed corresponding to the interrupt.

Next, with reference to a flow chart of FIG. 11, a method for causing a CPU 20 to acknowledge that transmission data has been received by receiving processors will be described. In this case, it is assumed that a processor 10-1 sends data to processors A, B, and C.

Figure 10:
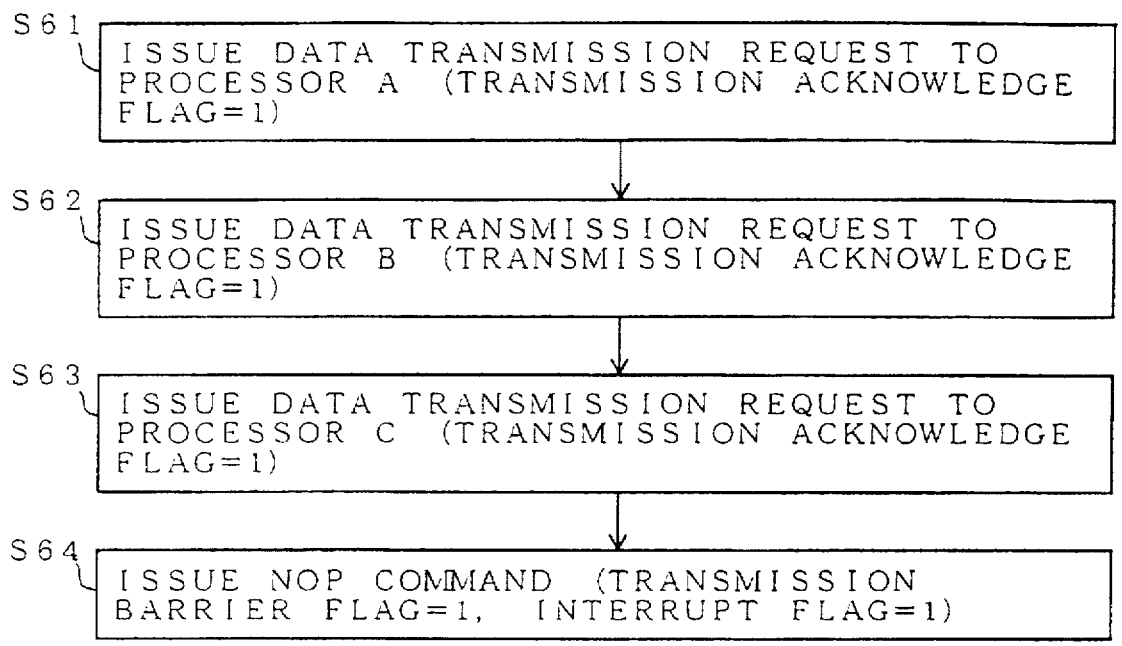
FIG. 10 is a second flow chart showing the process for acknowledging that data transmission has been completed.
Figure 11:
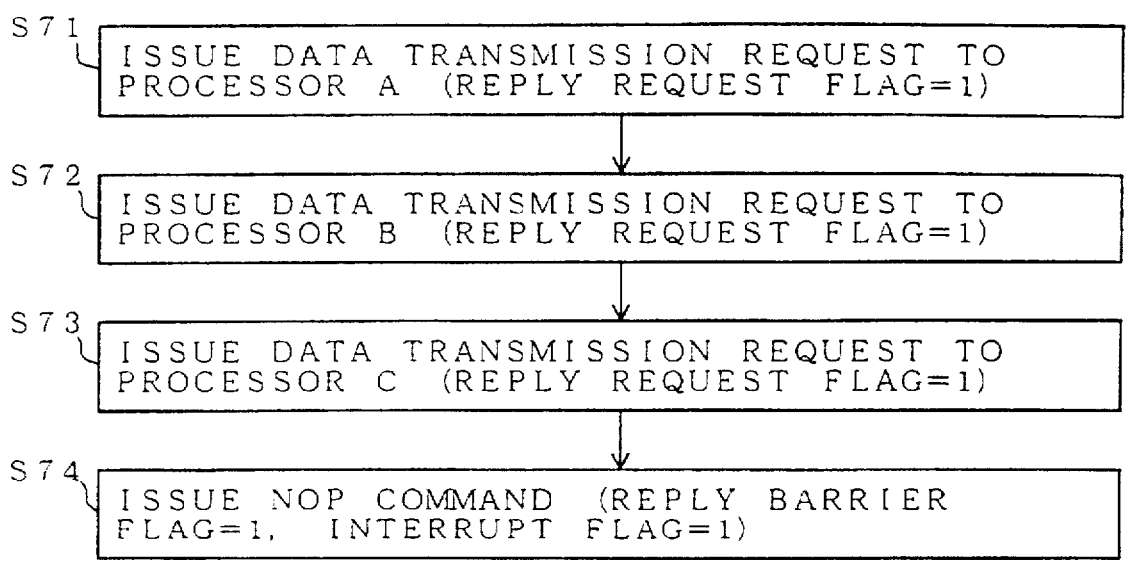
FIG. 11 is a second flow chart showing the process for acknowledging that data has been received by a receiving processor.

Steps S71 to S74 shown in FIG. 11 are basically the same as steps S61 to S64 shown in FIG. 10. However, the reply request flag of each of the data transmission request commands issued at steps S71 to S73 is set to "1". In addition, the reply barrier flag and the interrupt flag of the NOP command issued at step S74 are set to "1".

After the data transmission request commands for the processors A, B, and C are issued, the NOP command with the reply barrier flag="1"is issued. Thus, after the transmission data according to the three data transmission request commands has been received by the processors A, B, and C, the NOP command is executed. When the NOP command is processed corresponding to the sequence shown in FIG. 5, the flow advances to step S15. At step S15, an interrupt to the CPU 20-1 is generated.

Thus, the CPU 20-1 can acknowledge that the data has been received by the processors A, B, and C corresponding to the interrupt.

Figure 12:
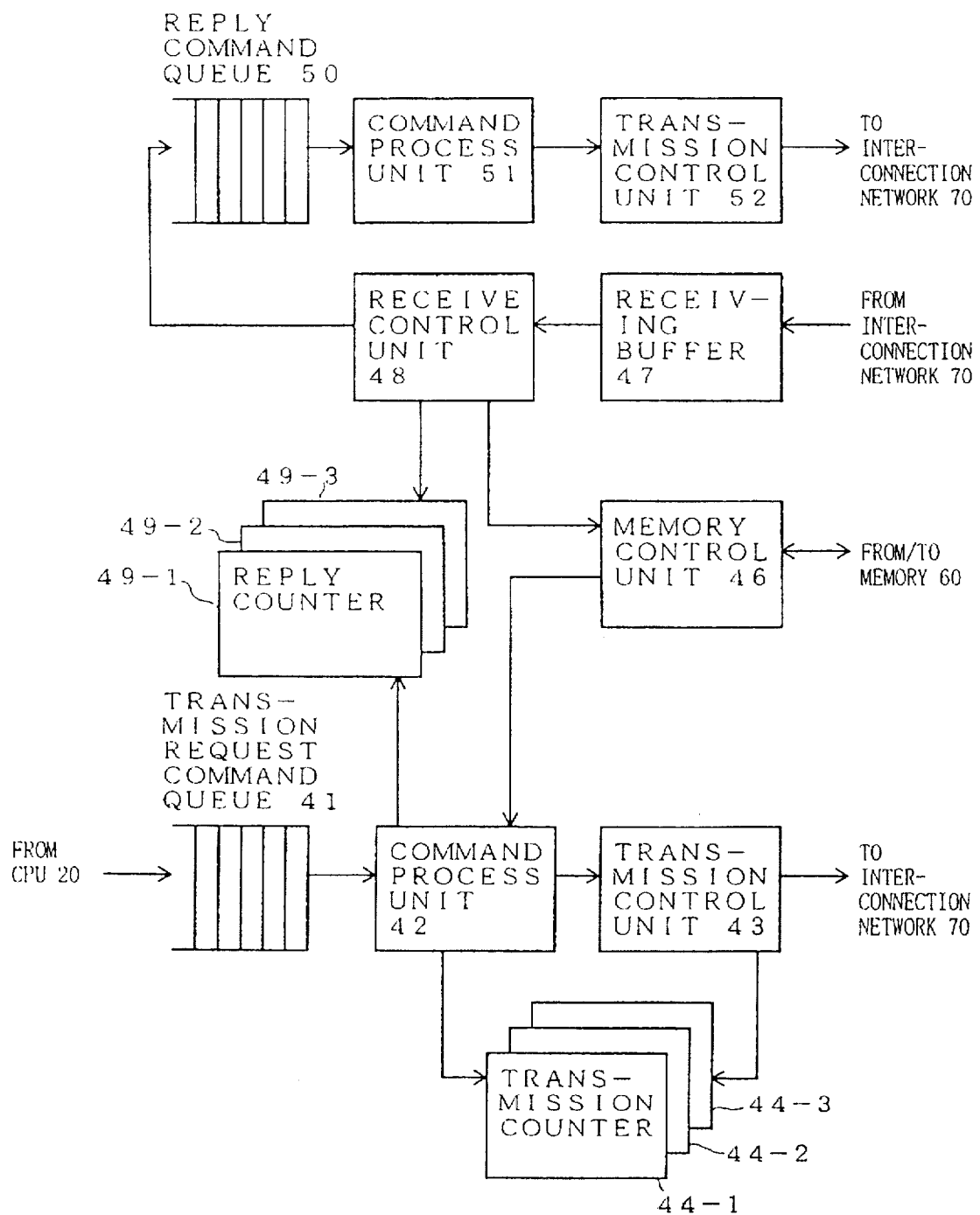
FIG. 12 is a block diagram showing a configuration of another send/receive control apparatus.

FIG. 12 is a block diagram showing a configuration of another send/receive control apparatus according to the present invention. In FIG. 12, the same units as FIG. 4 are denoted by the same reference numerals. In the send/receive control apparatus shown in FIG. 12, a plurality of transmission counters and a plurality of reply counters are provided.

Figure 13A:
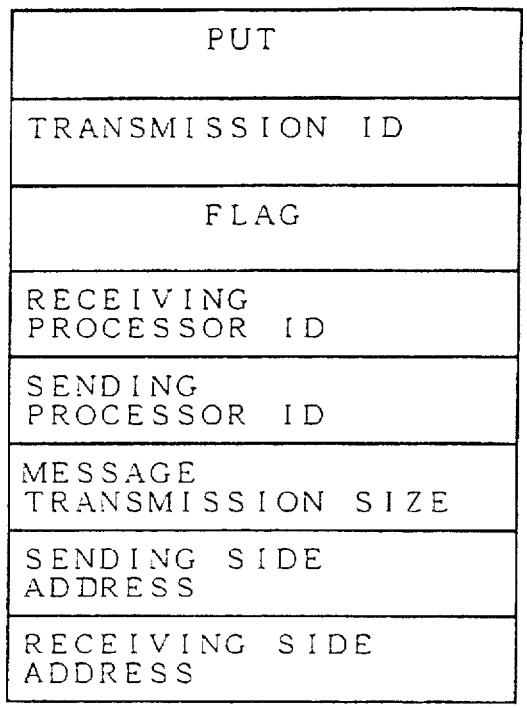
FIG. 13A is a schematic diagram showing a data transmission request command (No. 1) for use in the system having the send/receive control apparatus of FIG. 12.
Figure 13B:
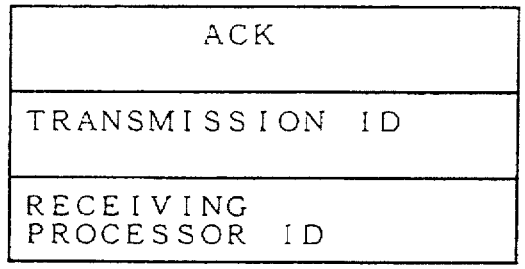
FIG. 13B is a schematic diagram showing a reply command (No. 1) for use in the system having the send/receive control apparatus of FIG. 12.
Figure 13C:
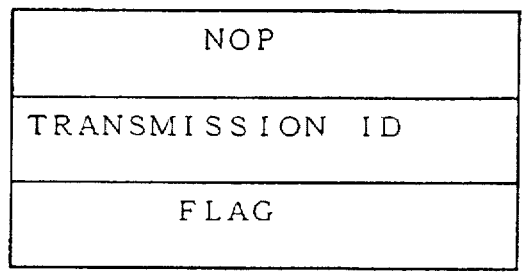
FIG. 13C is a schematic diagram showing an NOP command (No. 1) for use in the system having the send/receive control apparatus of FIG. 12.

FIGS. 13A, 13B, and 13C show commands used in a parallel processing system that uses the send/receive control apparatus shown in FIG. 12. In each command shown in FIGS. 13A, 13B, and 13C, "transmission ID" is added to each of the commands shown in FIGS. 3A, 3B, and 3C. The transmission ID designates one of transmission counters 44-1 to 44-3 or one of reply counters 49-1 to 49-3. For instance, when the data transmission command with the transmission acknowledge flag="1" and the transmission ID="2" is issued and executed, the transmission counter 44-2 is incremented. When data transmission caused by this command is completed, the transmission counter 44-2 is decremented.

In the above configuration, data to be sent to other processors is categorized as a plurality of groups. The data transmission commands for each group are assigned to one of the counters. This categorization is based on each group that requires establishment of synchronization. In the following description, when the processor 10-1 sends data to nine processors A to I, data transmission to the processors A, B, and C (first transmission) is assigned to the transmission counter 44-1. The data transmission to the processors D, E, and F (second transmission) is assigned to the transmission counter 44-2. The data transmission to the processors G, H, and I (third transmission) is assigned to the transmission counter 44-3.

In this case, nine data transmission commands are issued. The transmission ID of each of the data transmission request commands to the processors A, B, and C is set to "1". The transmission ID of each of the data transmission request commands to the processors D, E, and F is set to "2". The transmission ID of each of the data transmission request commands to the processors G, H, and I is set to "3".

When the CPU 20-1 of the processor 10-1 successively issues the nine data transmission request commands, it can acknowledge that each of the first transmission to third transmission has been completed. For instance, when the data transmission to the processors A to E is completed, the CPU 20-1 can acknowledge that the data transmission to the processors A, B, and C has been completed corresponding to the transmission counter 44-1. Thus, when a synchronous process in which the CPU 20-1 performs the next process upon completion of the data transmission to the processors A, B, and C is executed, the CPU 20-1 can perform the next process without need to wait until the data transmission to the processors D to I is completed. Thus, waiting time is reduced.

The CPU 20-1 acknowledges that the data transmission to the processors A, B, and C has been completed corresponding to an interrupt as shown in FIG. 10. In this case, three NOP commands with the transmission barrier flag=1 and the interrupt flag=1 are issued. The transmission IDs of these NOP commands are designated to "1", "2", and "3".

The data transmission request commands are assigned to the transmission counters corresponding to the groups that require synchronization.

In the above-described configuration, as the transmission ID that is designated to each command, values "1" to "3" that directly designate the counters were used. However, other identifying information may be used. For example, the transmission IDs may be designated corresponding to the receiving processor IDs. In this case, the relation between the processors and the counters is predetermined. When a command is issued, a transmission ID is designated corresponding to the receiving processor ID. As the relation between the processors and the counters, a plurality of processors as a group may be correlated with each counter. In addition, the relation may be dynamically varied corresponding to each process program.

In the above embodiment, it can be acknowledged that data transmission has been completed for each of the transmission counters 44-1 to 44-3. In a similar sequence, it can be acknowledged that data has been received by receiving processors for each of the reply counters 49-1 to 49-3.

Figure 14:
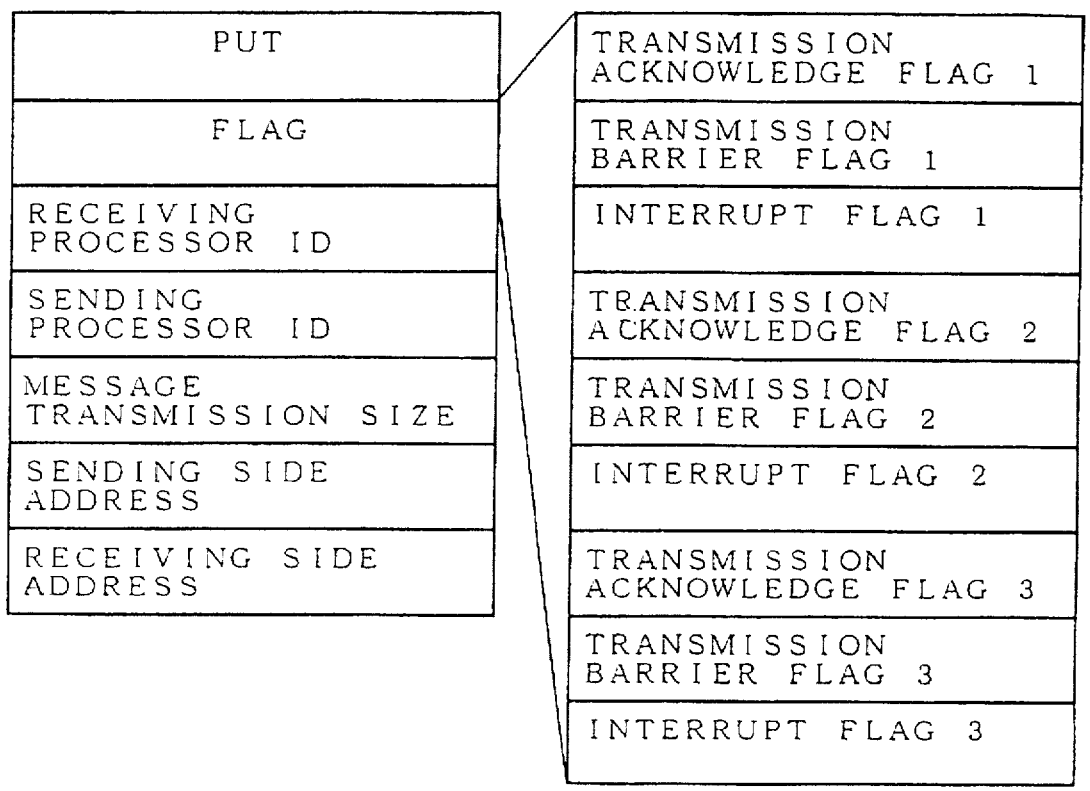
FIG. 14 is a schematic diagram showing a command (No. 2) for use in the system having the send/receive control apparatus of FIG. 12.
Figure 8:
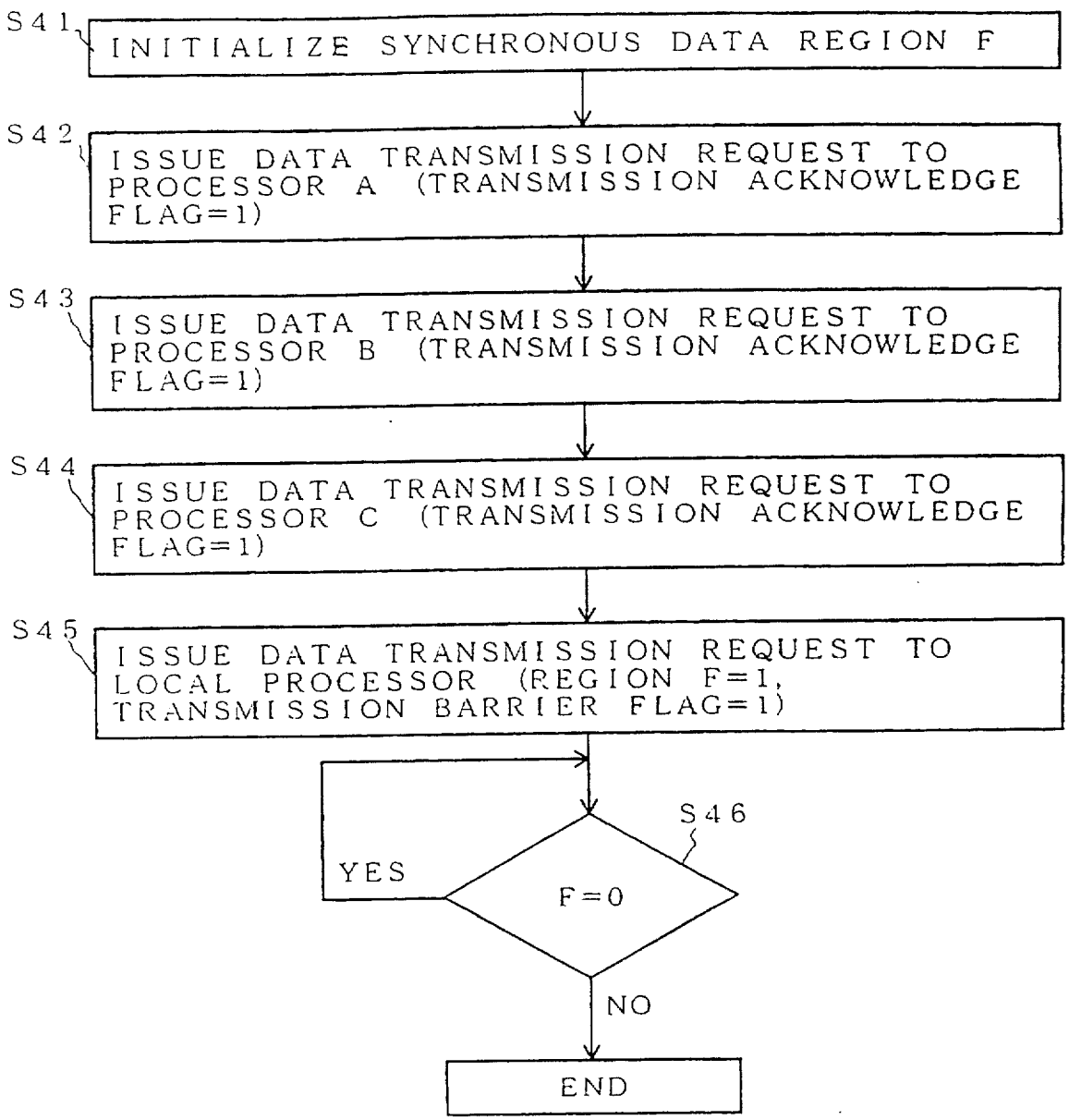

As described above, when a plurality of groups of data transmission are individually synchronized corresponding to a plurality of transmission counters, a command as shown in FIG. 14 may be used. In other words, flags of the data transmission request commands and the NOP commands are provided corresponding to the transmission counters 44-1 to 44-3. When a data transmission request command with the transmission request flag 2="1" is issued, the send/receive control apparatus causes the transmission counter 44-2 to increment. When the data transmission caused by the command is completed, the send/receive control apparatus causes the transmission counter 44-2 to decrement.

In the above-described embodiment, as shown in FIG. 1, each processor has a memory. However, the present invention is not limited to such a configuration. For example, as shown in FIG. 15, the present invention can be applied for a configuration in which n processors 80-1, 80-2 to 80-n access a common memory 91 through an interconnection network 90. In this case, each processor 80-1, 80-2 to 80-n has a send/receive control apparatus 82-1, 82-2 to 82-n, respectively, and a CPU 81-1, 81-2 to 81-n, respectively. In addition, the present invention can be applied for a configuration in which each processor 80-1 to 80-n has a cache memory.

As described above, according to the present invention, the CPU can securely acknowledge the completion of data transmission or reception of data by receiving processors with small overhead. In particular, when establishment of synchronization that is performed upon completion of data transmission to predetermined processors are required, a command with the enable state of the transmission barrier flag is issued after commands for sending data to such processors have been issued. The CPU acknowledges the completion of data transmission according to the previously issued commands corresponding to the execution of the command with the enable state of the transmission barrier flag. Thus, even if a plurality of data transmission requests are successively issued, the synchronization can be established by issuing one command (a data transmission request command or a NOP command with the enable state of the transmission barrier flag). Consequently, the data transmission time can be reduced. Likewise, when the establishment of synchronization that is performed upon reception of transmission data by predetermined processors are required, the data transmission time is reduced.

When data is sent to a receiving processor several times through an interconnection network that assures transmission sequence, a reply request is added to a command that sends last data. Thus, since the synchronization is satisfied with one reply command, the number of reply commands to be sent can be reduced, thereby decreasing overhead of the CPU.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A data transmission control method for use with synchronization in a parallel processing system having a plurality of processors connected through an interconnection network, comprising the steps of:

providing a barrier region in a data transmission request command for requesting data transmission;

setting an enable/disable state in the barrier region;

executing a first data transmission request command having the enable state set in the barrier region when an execution result of a second data transmission request command satisfies a predetermined condition, the second data transmission request command being issued before the first data transmission request commands;

executing a third data transmission request command having the disable state in the transmission barrier region irrespective of whether the data transmission according to a fourth data transmission request command is completed, the fourth data transmission request command being issued before the third data transmission request command.

2. A data transmission control method for use with synchronization in a parallel processing system having a plurality of processors connected through an interconnection network, comprising the steps of:

providing a transmission barrier region in a data transmission request command for requesting data transmission;

setting an enable state/disable state in the transmission barrier region;

executing a first data transmission request command having the enable state set in the transmission barrier region when the data transmission according to a second data transmission request command is completed, the second data transmission request command being issued before the first data transmission request command; and executing a third data transmission request command having the disable state in the transmission barrier region irrespective of whether the data transmission according to a fourth data transmission request command is completed, the fourth data transmission request command being issued before the third data transmission request command.

3. The data transmission control method as set forth in claim 2, further comprising the steps of:

writing data that represents the completion of the data transmission to a predetermined area of a memory using the first data transmission request command; and determining that the data transmission according for the second data transmission request command is completed when data that represents the completion of the data transmission is stored in the predetermined area of the memory.

4. The data transmission control method as set forth in claim 2, further comprising the steps of:

providing an interrupt region in the first data transmission request command;

setting the enable state in the interrupt region; and generating an interrupt that represents the completion of the data transmission for the second data transmission request command when the first data transmission request command is executed.

5. A data transmission control method for use with a parallel processing system having a plurality of processors connected through an interconnection network, comprising the steps of:

providing a transmission acknowledge barrier region in a data transmission request command for requesting data transmission, the transmission acknowledge barrier region being used for synchronization in the parallel processing system;

setting an enable state/disable state in the transmission acknowledge barrier region;

incrementing a number of first transmission requests when a first data transmission request command having the enable state set in the transmission acknowledge barrier region is issued;

decrementing the number of first transmission requests when the first data transmission request command is executed and the data transmission is completed;

holding the number of first transmission requests when a second data transmission request command having the disable state in the transmission acknowledge barrier region is issued;

holding the number of first transmission requests while the second transmission request command is executed and executing the second transmission request irrespective of the number of first transmission requests; and determining whether the data transmission for the first data transmission request command is completed based on the number of first data transmission requests.

6. The data transmission control method as set forth in claim 5, wherein each of the data transmission request commands has attribute information that designates a group for establishing synchronization and the first data transmission request command has attribute information designating a first group; and wherein the method further comprises the steps of:

incrementing a number of third transmission requests when a third data transmission request command having the enable state set in the transmission acknowledge region has attribute information that designates a second group;

decrementing the number of third transmission requests when the third data transmission is completed; and independently determining whether the data transmission for each of the first and third data transmission request commands is completed based on the number of first transmission requests and the number of third transmission requests.

7. The data transmission control method as set forth in claim 5, further comprising the steps of:

providing a transmission barrier region in the data transmission request command for requesting data transmission;

setting an enable state/disable state to the transmission barrier region; and executing a third data transmission request command having the enable state set in the transmission barrier region when the data transmission for the first data transmission request command is completed based on the number of first transmission requests, the third data transmission request command being issued after the first data transmission request command.

8. The data transmission control method as set forth in claim 7, further comprising the steps of:

writing data that represents the completion of the data transmission to a predetermined area of a memory using the third data transmission request command; and determining that the data transmission for the first data transmission request command is completed when the data that represents the completion of the data transmission is stored in the predetermined area of the memory.

9. The data transmission control method as set forth in claim 7, further comprising the steps of:

providing an interrupt region in the third data transmission request command;

setting an enable state in the interrupt region; and generating an interrupt that represents the completion of the data transmission for the first data transmission request command when the third data transmission request command is executed.

10. A data transmission control method for use with a parallel processing system having a plurality of processors connected through an interconnection network, comprising the steps of:

providing a reply barrier region in a data transmission request command for requesting data transmission;

setting an enable state/disable state to the reply barrier region; and executing a first data transmission request command having the enable state set in the reply barrier region when data transmitted according to a second data transmission request command is received by a receiving processor irrespective of a transmission acknowledgement synchronization barrier and irrespective of a number of first transmission requests, the second data transmission request command being issued before the first data transmission request command.

11. The data transmission control method as set forth in claim 10, further comprising the step of:

writing data that represents that data transmitted for the first data transmission request command is received by the receiving processor to a predetermined area of a memory using the first data transmission request command; and determining that the data transmitted for the second data transmission request command is received by the receiving processor when the data that represents that the data transmitted for the first data transmission request command and received by the receiving processor is stored in the predetermined area of the memory.

12. The data transmission control method as set forth in claim 10, further comprising the steps of:

providing an interrupt region in the first data transmission request command;

setting an enable state in the interrupt region; and generating an interrupt that represents that the data transmitted for the second data transmission request command is received by the receiving processor when the first data transmission request command is executed.

13. A data transmission control method for use with a parallel processing system having a plurality of processors connected through an interconnection network, comprising the steps of:

providing a reply request region in a data transmission request command for requesting data transmission;

setting an enable state/disable state in the reply request region;

incrementing the number of first transmission requests when a first data transmission request command having the enable state set in the reply request region is issued;

decrementing the number of first transmission requests when the data transmitted according to the first data transmission request command is received by a receiving processor and a reply signal is returned from the receiving processor;

holding the number of first transmission requests while the second transmission request command is executed and executing the second transmission request irrespective of the number of first transmission requests; and determining whether the data transmitted for the first data transmission request command is received based on the number of first transmission requests.

14. The data transmission control method as set forth in claim 13, wherein each of the data transmission request commands has attribute information that designates a group for establishing barrier synchronization and the first data transmission request command has attribute information designating a first group; and wherein the method further comprises the steps of:

incrementing the number of second transmission requests when a second data transmission request command having the enable state set in the reply request region has attribute information that designates a second group;

decrementing the number of second transmission requests when the data transmitted for the second data transmission request command is received by a receiving processor; and independently determining whether data transmitted according to each of the first and second data transmission request commands is received by the receiving processor based on the number of first transmission requests and the number of second transmission requests.

15. The data transmission control method as set forth in claim 13, further comprising the steps of:

providing a reply barrier region in the data transmission request command;

setting an enable state/disable state in the reply barrier region; and executing a second data transmission request command having the enable state set in the reply barrier region when the data transmitted for the first data transmission request command is received by the receiving processor based on the number of first transmission requests, the second data transmission request command being issued after the first data transmission request command.

16. The data transmission control method as set forth in claim 15, further comprising the steps of:

writing data that represents that the data transmitted for the second data transmission request command is received by the receiving processor to a predetermined area of a memory using the second data transmission command; and determining that the data transmitted for the first data transmission request command is received by the receiving processor when the data that represents that the data transmitted for the second data transmission request received by the receiving processor is stored in the predetermined area of the memory.

17. The data transmission control method as set forth in claim 15, further comprising the steps of:

providing an interrupt region in the second data transmission request command;

setting an enable state in the interrupt region; and generating an interrupt that represents that the data transmitted for the first data transmission data is received by the receiving processor when the second transmission request command is executed.

18. A send/receive control apparatus for use with synchronization in a parallel processing system having a plurality of processors connected through an interconnection network, comprising:

check means for determining whether a barrier region of a data transmission request command is in an enable state when the data transmission request command for requesting data transmission is received; and control means for executing a first data transmission request command having the barrier region in the enable state when an execution result of a second data transmission request command satisfies a predetermined condition irrespective of a transmission acknowledgement synchronization barrier and irrespective of a number of first transmission requests, the second data transmission request command being issued before the first data transmission request command.

19. A send/receive control apparatus for use with synchronization in a parallel processing system having a plurality of processors connected through an interconnection network, comprising:

check means for determining whether a transmission barrier region of a data transmission request command is in an enable state when the data transmission request for requesting data transmission is received; and control means for executing a first data transmission request command having the transmission barrier region in the enable state when data transmission according to a second data transmission request command is completed irrespective of a transmission acknowledgement synchronization barrier and irrespective of a number of first transmission requests, the second data transmission request command being issued before the first data transmission request command.

20. A send/receive control apparatus for use with synchronization in a parallel processing system having a plurality of processors connected through an interconnection network, comprising:

count means for counting a number transmission requests;

check means for determining whether a transmission acknowledge barrier region of a data transmission request command is in an enable state when the data transmission request command for requesting data transmission is received; and control means for incrementing said count means when a first data transmission request command, having the transmission acknowledge barrier region in the enable state, is received, for decrementing said count means when the data transmission for the first data transmission request command is completed by acknowledgement, for holding the number of first transmission requests while the second transmission request command is executed and executing the second transmission request irrespective of the number of first transmission requests, and for determining whether the data transmission for the first data transmission request command is completed based on the count value of said count means.

21. The send/receive control apparatus as set forth in claim 20, wherein said check means is adapted for determining whether a transmission barrier region of the data transmission request command is in the enable state when the data transmission request command is received, and wherein said control means is adapted for executing a second data transmission request command having the transmission barrier region in the enable state when the data transmission for the first data transmission request command is completed based on the count value of the count means, the second data transmission request command being received after the first data transmission request command.

22. A send/receive control apparatus for use with a parallel processing system having a plurality of processors connected through an interconnection network, comprising:

check means for determining whether a reply barrier region of a data transmission request command is in an enable state when the data transmission request command for requesting data transmission is received; and control means for executing a first data transmission request command having the reply barrier region in the enable state when data transmitted according to a second data transmission request command is received by a receiving processor irrespective of a transmission acknowledgement synchronization barrier and irrespective of a number of first transmission requests, the second data transmission request command being received before the first data transmission request command.

23. A send/receive control apparatus for use with a parallel processing system having a plurality of processors connected through an interconnection network, comprising:

count means for counting a number of transmission requests that require a reply from a receiving processor;

check means for determining whether a reply request region of a data transmission command is in an enable state when the data transmission command is in an enable state when the data transmission request command for requesting data transmission is received; and control means for incrementing said count means when a first data transmission request command having the reply request region in the enable state is received, for decrementing said count means when the data transmitted for the first data transmission request command is received by a receiving processor irrespective of a transmission acknowledgement synchronization barrier, and for determining whether the data transmitted for the first data transmission request command is received by the receiving processor based on the count value of said count means.

24. The send/received control apparatus as set forth in claim 23, wherein said check means is adapted for determining whether a reply barrier region of the data transmission request command is in an enable state when the data transmission request command is received; and wherein said control means is adapted for executing a second data transmission request command having the reply barrier region in the enable state when the data transmitted for the first data transmission request command is received by the receiving processor based on the count value of said count means, the second data transmission request command being received after the first data transmission request command.

* * * * *

UNITED STATES PATENT AND TRADEMARK OFFICE
CERTIFICATE OF CORRECTION

PATENT NO.: 5,790,398
DATED : August 4, 1998
INVENTOR(S): Takeshi HORIE

It is certified that error appears in the above-identified patent and that said Letters Patent is hereby corrected as shown below:

Col. 2, line 18, change "competed" to --completed--.
Col. 4, line 11, change "20" to --3000--; and
          line 29, change "30" to --30-n--.
Col. 5, line 10, delete "to"; and
          line 19, delete "to".
Col. 17, line 35, delete "according".

FIG. 8 shows an incorrect figure. Please correct FIG. 8 to correspond to the figure as filed May 18, 1998, a copy of which is attached hereto.

Signed and Sealed this

Sixth Day of April, 1999

Attest:

Q. TODD DICKINSON

Attesting Officer

Acting Commissioner of Patents and Trademarks